(12) United States Patent
Nishimura

(10) Patent No.: US 6,769,608 B2
(45) Date of Patent: Aug. 3, 2004

(54) IC CARD ISSUANCE SYSTEM

(75) Inventor: Saori Nishimura, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 10/015,667

(22) Filed: Dec. 17, 2001

(65) Prior Publication Data

US 2003/0222137 A1 Dec. 4, 2003

(30) Foreign Application Priority Data

May 14, 2001 (JP) .......................................... 2001-143529

(51) Int. Cl.[7] .............................................. G06F 17/00
(52) U.S. Cl. ...................................... 235/380; 235/375
(58) Field of Search ................................ 235/380, 441, 235/381, 375, 449, 451; 902/25, 26, 29, 38; 705/35, 41; 380/270; 713/193

(56) References Cited

U.S. PATENT DOCUMENTS

| | | | | | |
|---|---|---|---|---|---|
| 5,463,208 A | * | 10/1995 | Sasou et al. | ................. | 235/380 |
| 5,479,003 A | * | 12/1995 | Yamada | ........................ | 235/380 |
| 5,592,400 A | * | 1/1997 | Sasou et al. | ................. | 235/375 |
| 5,648,647 A | * | 7/1997 | Seiler | .......................... | 235/380 |
| 5,714,743 A | * | 2/1998 | Chiba et al. | ................. | 235/449 |
| 5,959,278 A | * | 9/1999 | Kobayashi et al. | ......... | 235/449 |
| 6,082,617 A | * | 7/2000 | Meyer-Wittreck et al. | .. | 235/381 |
| 6,105,861 A | * | 8/2000 | Kuit | ............................ | 235/375 |
| 6,176,424 B1 | * | 1/2001 | Meyer-Wittreck et al. | .. | 235/381 |
| 2002/0029348 A1 | * | 3/2002 | Du et al. | ..................... | 713/193 |
| 2002/0114468 A1 | * | 8/2002 | Nishimura | .................. | 380/270 |
| 2002/0139860 A1 | * | 10/2002 | Ono et al. | ................... | 235/487 |

FOREIGN PATENT DOCUMENTS

| | | | |
|---|---|---|---|
| EP | 0 430 257 A2 | | 6/1991 |
| EP | 1 034 517 B1 | * | 6/1999 |
| JP | 58-109970 A | * | 6/1983 |
| JP | 10-124621 A | * | 5/1998 |
| JP | 11-085919 | | 3/1999 |
| JP | 11-328322 A | * | 11/1999 |
| JP | 2000-268137 | | 9/2000 |
| JP | 2001-88478 | | 4/2001 |
| JP | 2001-300108 A | * | 10/2001 |
| WO | WO 94/16415 | | 7/1994 |
| WO | WO 99/57675 | | 11/1999 |

* cited by examiner

*Primary Examiner*—Jared J. Fureman
(74) *Attorney, Agent, or Firm*—Pillsbury Winthrop LLP

(57) ABSTRACT

The present invention provides an IC card issuance system that issues an IC card by writing issuance data including an ID specific to the IC card into a memory of the IC card, wherein, when reissuing an IC card identical to an issued IC card, an ID of an IC card to be reissued is read out from the IC card. A record having an ID that corresponds to the read out ID is retrieved and output from an issuance file having stored issuance data of the issued IC card therein, and reissuing of the IC card is based on the output record (issuance data).

16 Claims, 28 Drawing Sheets

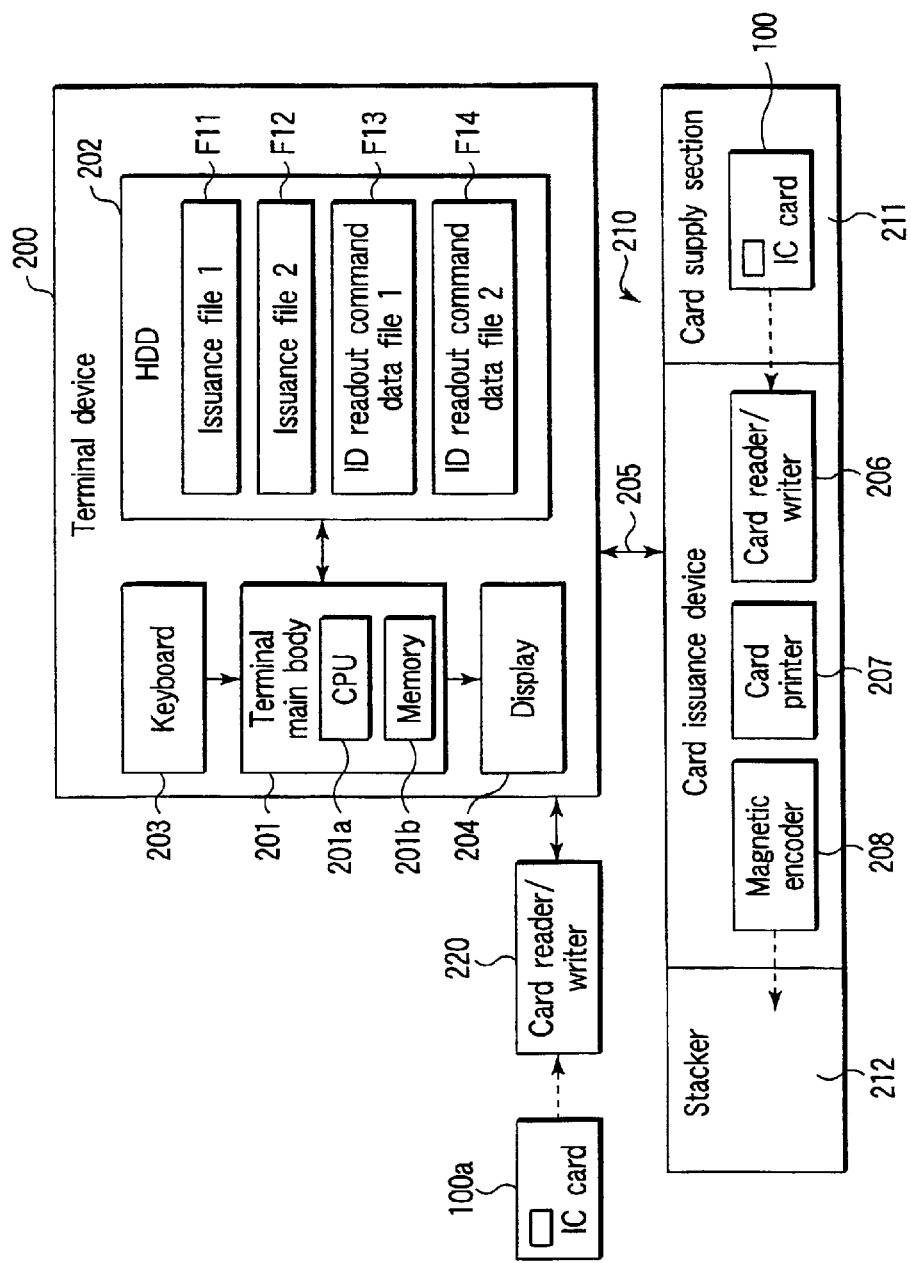
F I G. 1

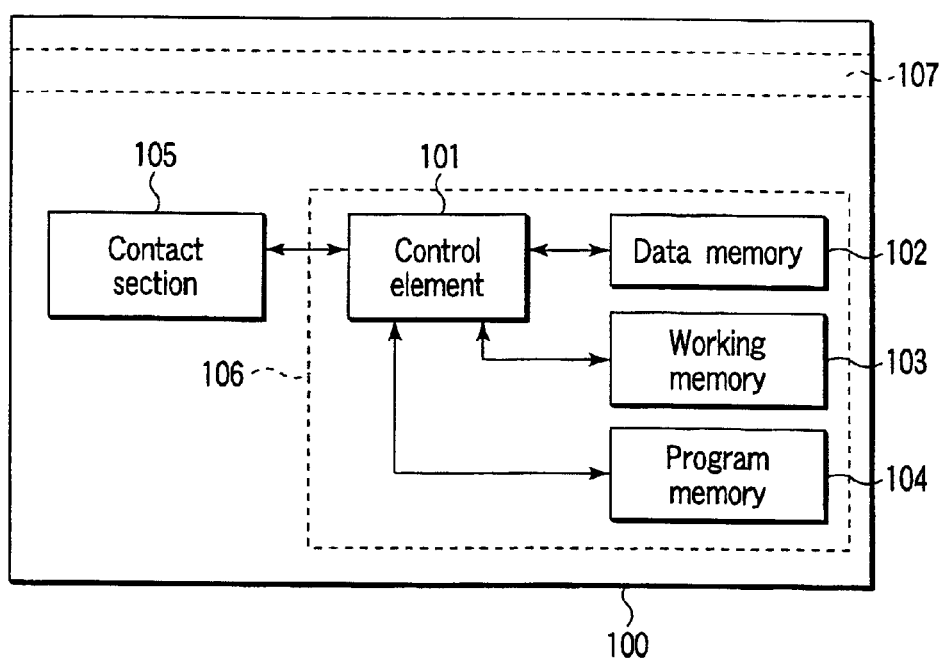
F I G. 2

F11

| | Item 1 : (Print data) Name (Chinese character) | Item 2 : (Print data) Membership number (ID) | Item 3 : (IC command data) Membership number (ID) |
|---|---|---|---|
| Record #1 | UG1=Tanaka taro | UG2=000007 | IC1=Write Address #1 000007 |
| Record #2 | UG1=Suzuki jiro | UG2=000014 | IC1=Write Address #1 000014 |
| ... | ... | ... | ... |
| Record #13 | UG1=Hayashi saburo | UG2=000157 | IC1=Write Address #1 000157 |
| Record #14 | UG1=Matsumoto shiro | UG2=000004 | IC1=Write Address #1 000004 |
| ... | ... | ... | ... |
| Record #21 | UG1=Nakamura goro | UG2=002004 | IC1=Write Address #1 002004 |

| Item 4 : (IC command data) Validity | Item 5 : (IC command data) Password | Item 6 : (IC command data) Key 1 |
|---|---|---|
| IC2=Write Address #2 2000.09 | IC3=Set Key 737c545a87 | IC4=Set Key 93 24..d8 88 AB |
| IC2=Write Address #2 2001.10 | IC3=Set Key 4787ea7184 | IC4=Set Key d0 93..b2 cb 46 |
| ... | ... | ... |
| IC2=Write Address #2 2005.08 | IC3=Set Key c8d7eb567f | IC4=Set Key 82 6a..eb 0b 87 |
| IC2=Write Address #2 2002.07 | IC3=Set Key 8181fc35d8 | IC4=Set Key 49 83..6c 44 78 |
| ... | ... | ... |
| IC2=Write Address #2 2000.12 | IC3=Set Key eefaac5620 | IC4=Set Key 35 89..fb f9 90 |

F I G. 3

| Item 1: (IC command data) PIN correlation | Item 2: (IC command data) directory selection | Item 3: (IC command data) EF selection | Item 4: (IC command data) Address #1 readout |
|---|---|---|---|
| IC1=Verify PIN | IC2=Select ADF | IC3=Select EF | IC4=Read Record #1 |

F I G. 4

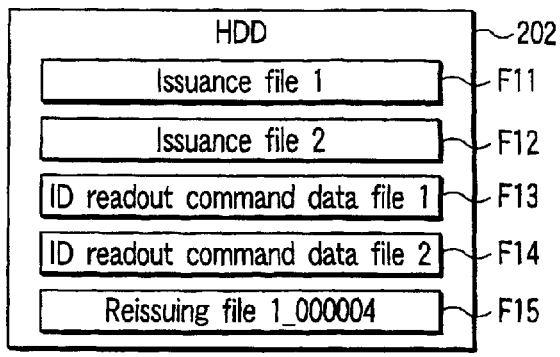
F I G. 14
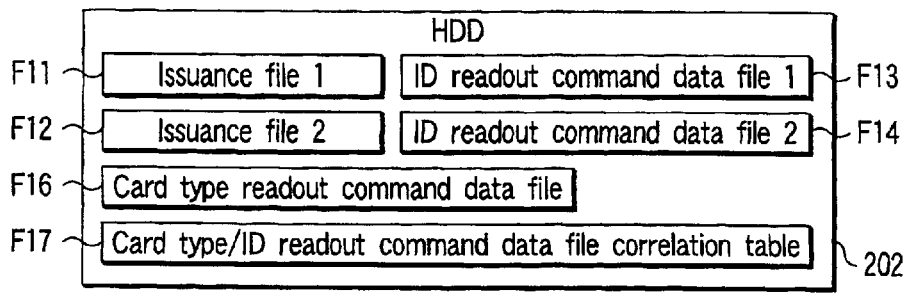
F I G. 15
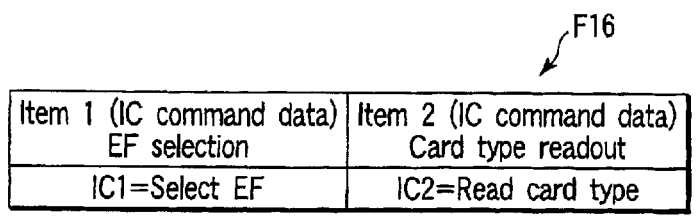
F I G. 16
| Card type information | ID readout command data file name |
|---|---|
| 010 | ID readout command data file 1 |
| 020 | ID readout command data file 2 |
F17
F I G. 17

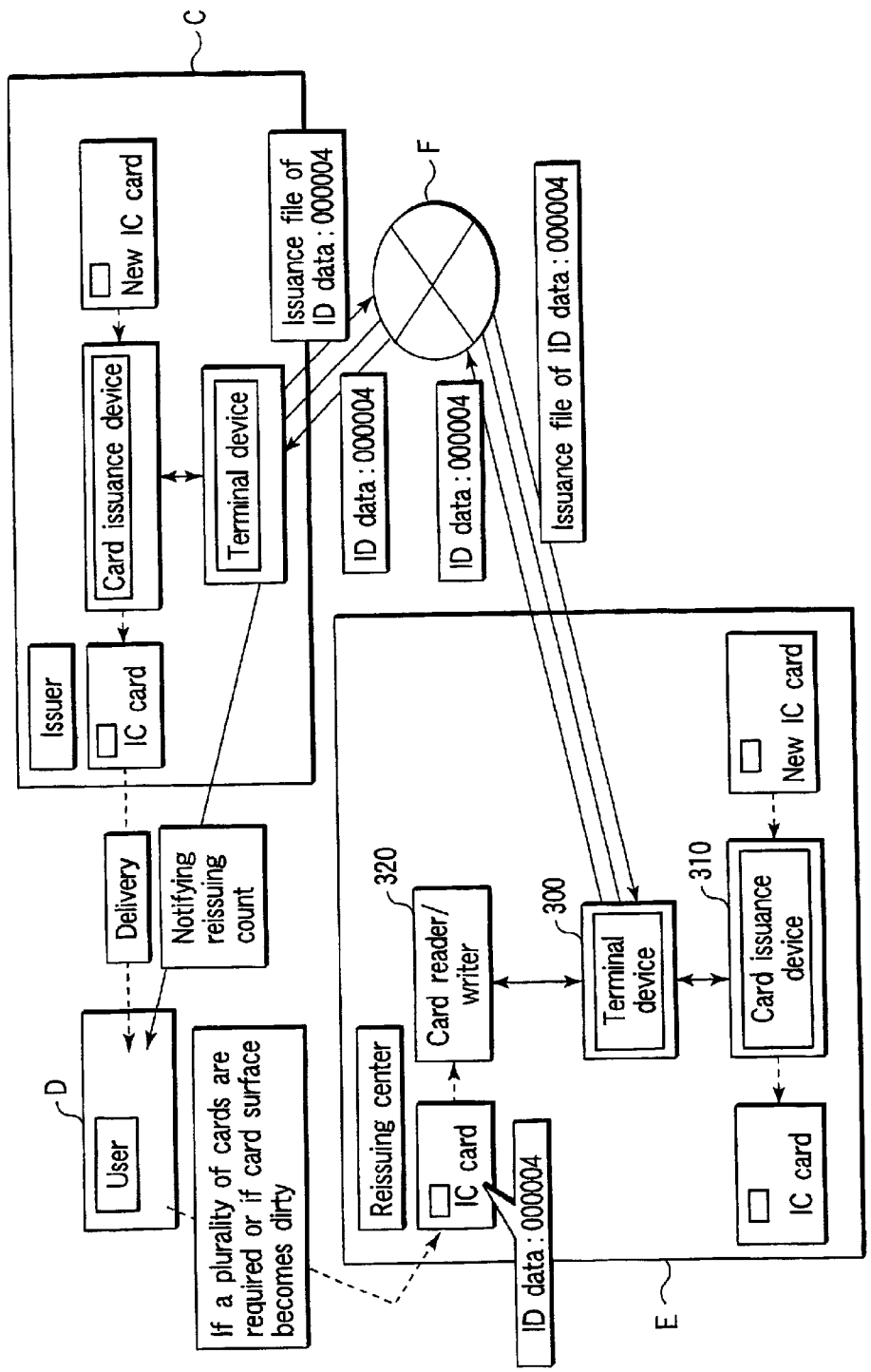
F I G. 20

| | Item 1: (Print data)<br>Name (Chinese character) | Item 2: (Print data)<br>Membership number (ID) | Item 3: (IC command data)<br>Membership number (ID) |
|---|---|---|---|
| Record #1 | UG1=Tanaka taro | UG2=000007 | IC1=Write Address #1 000007 |
| Record #2 | UG1=Suzuki jiro | UG2=000014 | IC1=Write Address #1 000014 |
| ... | ... | ... | ... |
| Record #13 | UG1=Hayashi saburo | UG2=000157 | IC1=Write Address #1 000157 |
| Record #14 | UG1=Matsumoto shiro | UG2=000004 | IC1=Write Address #1 000004 |
| ... | ... | ... | ... |
| Record #21 | UG1=Nakamura goro | UG2=002004 | IC1=Write Address #1 002004 |

| Item 4: (IC command data)<br>Validity | Item 5: (IC command data)<br>Password | Item 6<br>Issuance count |
|---|---|---|
| IC2=Write Address #2 2000.09 | IC3=Set Key 737c545a87 | Num=0 |
| IC2=Write Address #2 2001.10 | IC3=Set Key 4787ea7184 | Num=0 |
| ... | ... | ... |
| IC2=Write Address #2 2005.08 | IC3=Set Key c8d7eb567f | Num=0 |
| IC2=Write Address #2 2002.07 | IC3=Set Key 8181fc35d8 | Num=0 |
| ... | ... | ... |
| IC2=Write Address #2 2000.12 | IC3=Set Key eefaac5620 | Num=0 |

F I G. 21

|  | Item 1 : (Print data)<br>Name (Chinese character) | Item 2 : (Print data)<br>Membership number (ID) | Item 3 : (IC command data)<br>Membership number (ID) |
|---|---|---|---|
| Record #1 | UG1=Tanaka taro | UG2=000007 | IC1=Write Address #1 000007 |
| Record #2 | UG1=Suzuki jiro | UG2=000014 | IC1=Write Address #1 000014 |
| ... | ... | ... | ... |
| Record #13 | UG1=Hayashi saburo | UG2=000157 | IC1=Write Address #1 000157 |
| Record #14 | UG1=Matsumoto shiro | UG2=000004 | IC1=Write Address #1 000004 |
| ... | ... | ... | ... |
| Record #21 | UG1=Nakamura goro | UG2=002004 | IC1=Write Address #1 002004 |

| Item 4 : (IC command data)<br>Validity | Item 5 : (IC command data)<br>Password | Item 6<br>Issuance count |
|---|---|---|
| IC2=Write Address #2 2000.09 | IC3=Set Key 737c545a87 | Num=1 |
| IC2=Write Address #2 2001.10 | IC3=Set Key 4787ea7184 | Num=1 |
| ... | ... | ... |
| IC2=Write Address #2 2005.08 | IC3=Set Key c8d7eb567f | Num=1 |
| IC2=Write Address #2 2002.07 | IC3=Set Key 8181fc35d8 | Num=3 |
| ... | ... | ... |
| IC2=Write Address #2 2000.12 | IC3=Set Key eefaac5620 | Num=1 |

F I G. 22

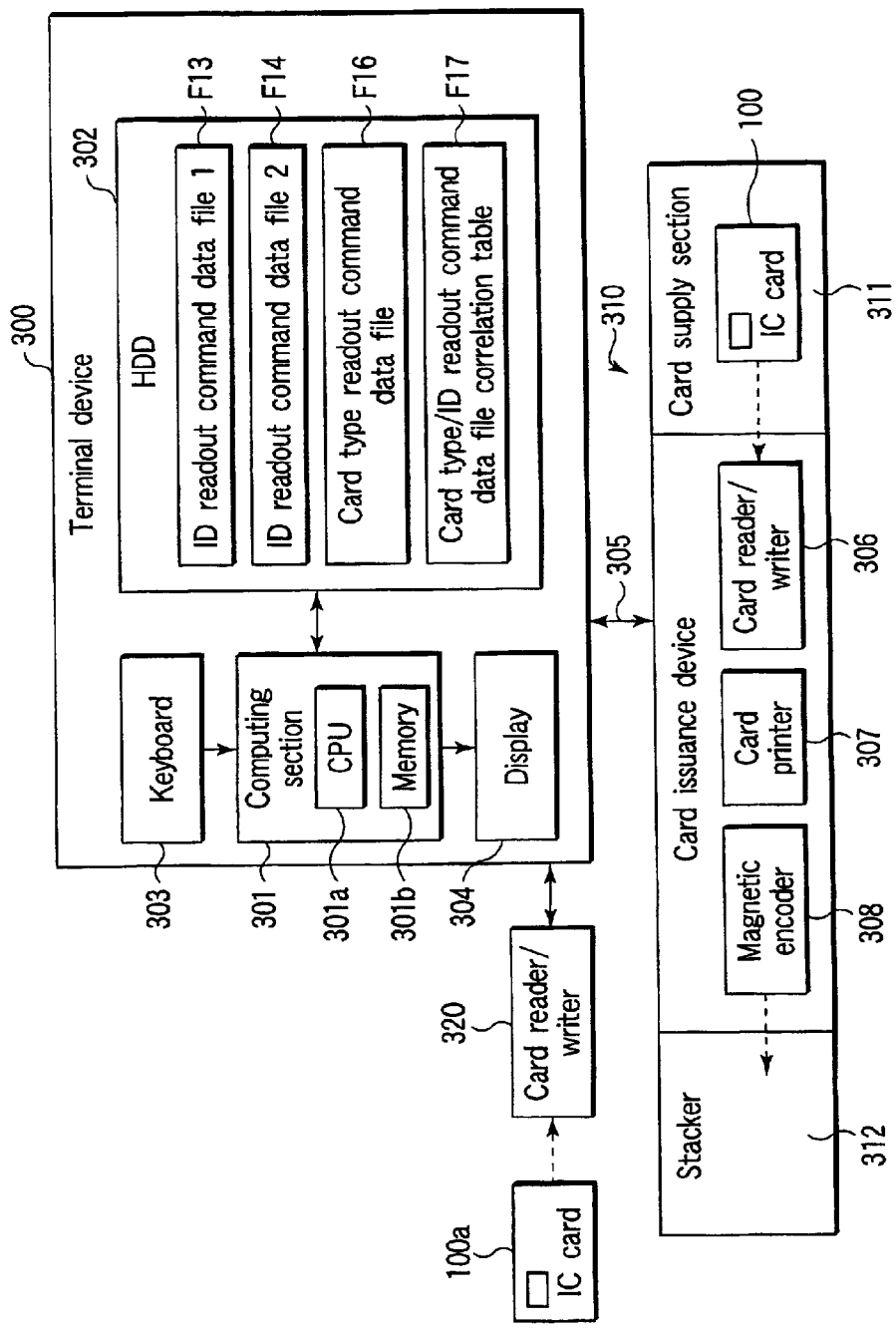
F I G. 23

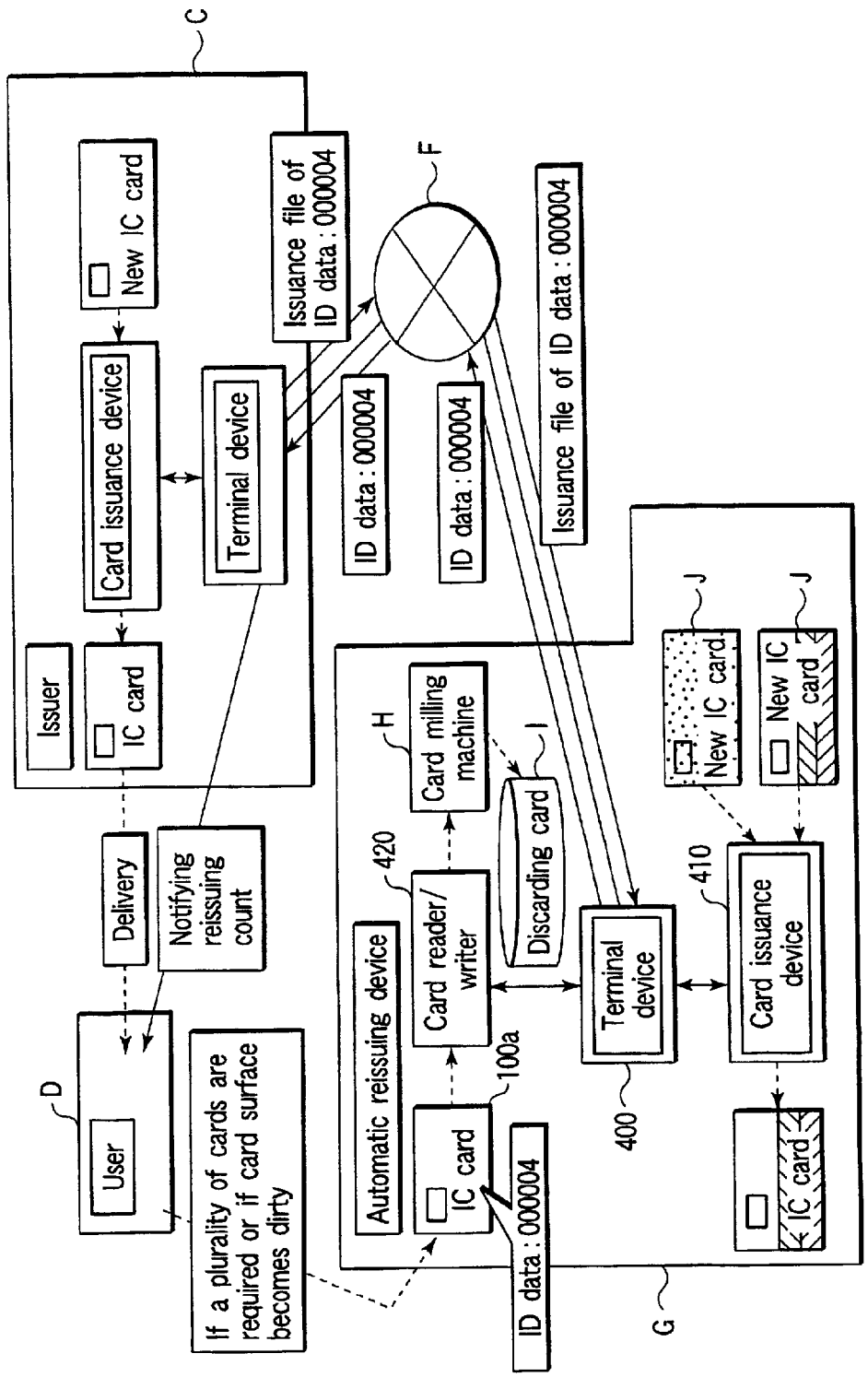
F I G. 30

| | Item 1: (Print data) Name (Chinese character) | Item 2: (Print data) Membership number (ID) | Item 3: (IC command data) Membership number (ID) |
|---|---|---|---|
| Record #1 | UG1=Tanaka taro | UG2=000007 | IC1=Write Address #1 000007 |
| Record #2 | UG1=Suzuki jiro | UG2=000014 | IC1=Write Address #1 000014 |
| ... | ... | ... | ... |
| Record #13 | UG1=Hayashi saburo | UG2=000157 | IC1=Write Address #1 000157 |
| Record #14 | UG1=Matsumoto shiro | UG2=000004 | IC1=Write Address #1 000004 |
| ... | | | |
| Record #21 | UG1=Nakamura goro | UG2=002004 | IC1=Write Address #1 002004 |

| Item 4: (IC command data) Validity | Item 5: (IC command data) Password | Item 6 Issuance count | Item 7: Card type/state |
|---|---|---|---|
| IC2=Write Address #2 2000.09 | IC3=Set Key 737c545a87 | Num=0 | Individual/General |
| IC2=Write Address #2 2001.10 | IC3=Set Key 4787ea7184 | Num=0 | Individual/General |
| ... | ... | ... | ... |
| IC2=Write Address #2 2005.08 | IC3=Set Key c8d7eb567f | Num=0 | Individual/General |
| IC2=Write Address #2 2002.07 | IC3=Set Key 8181fc35d8 | Num=0 | Individual/General |
| ... | ... | ... | ... |
| IC2=Write Address #2 2000.12 | IC3=Set Key eefaac5620 | Num=0 | Individual/General |

F I G. 32

| | Item 1: (Print data)<br>Name (Chinese character) | Item 2: (Print data)<br>Membership number (ID) | Item 3: (IC command data)<br>Membership number (ID) |
|---|---|---|---|
| Record #1 | UG1=Tanaka taro | UG2=000007 | IC1=Write Address #1 000007 |
| Record #2 | UG1=Suzuki jiro | UG2=000014 | IC1=Write Address #1 000014 |
| ... | ... | ... | ... |
| Record #13 | UG1=Hayashi saburo | UG2=000157 | IC1=Write Address #1 000157 |
| Record #14 | UG1=Matsumoto shiro | UG2=000004 | IC1=Write Address #1 000004 |
| ... | | | |
| Record #21 | UG1=Nakamura goro | UG2=002004 | IC1=Write Address #1 002004 |

| Item 4: (IC command data)<br>Validity | Item 5: (IC command data)<br>Password | Item 6<br>Issuance count | Item 7:<br>Card type/state |
|---|---|---|---|
| IC2=Write Address #2 2000.09 | IC3=Set Key 737c545a87 | Num=1 | Individual/General |
| IC2=Write Address #2 2001.10 | IC3=Set Key 4787ea7184 | Num=2 | Individual/Gold |
| ... | ... | ... | ... |
| IC2=Write Address #2 2005.08 | IC3=Set Key c8d7eb567f | Num=1 | Individual/General |
| IC2=Write Address #2 2002.07 | IC3=Set Key 8181fc35d8 | Num=3 | Family 2/General |
| ... | ... | ... | ... |
| IC2=Write Address #2 2000.12 | IC3=Set Key eefaac5620 | Num=1 | Disengagement |

F I G. 33

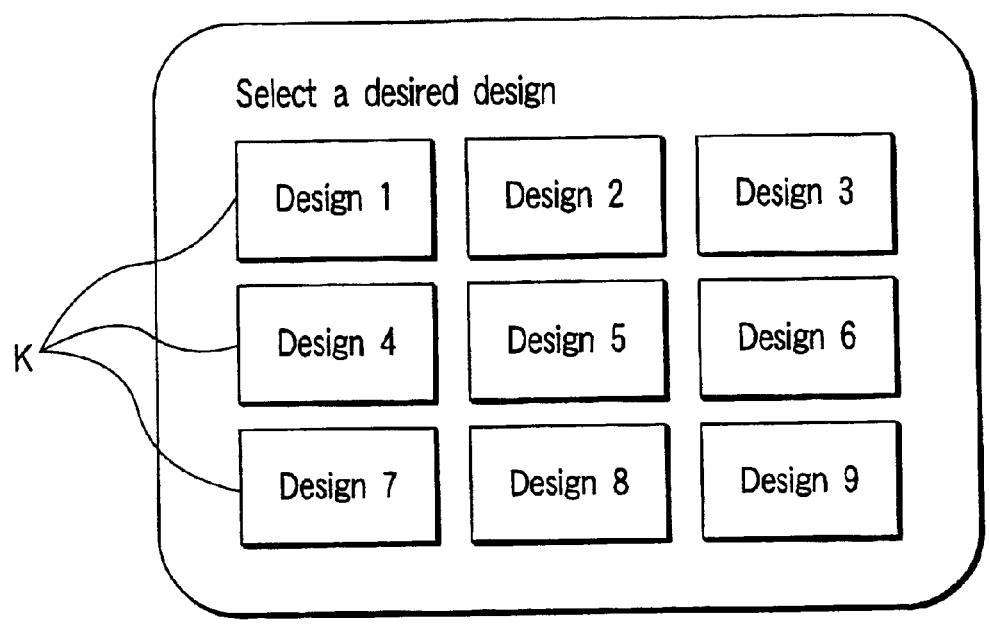
F I G. 36

IC CARD ISSUANCE SYSTEM

CROSS-REFERENCE TO RELATED APPLICATIONS

This application is based upon and claims the benefit of priority from the prior Japanese Patent Application No. 2001-143529, filed May 14, 2001, the entire contents of which are incorporated herein by reference.

BACKGROUND OF THE INVENTION

1. Field of the Invention

The present invention relates to an IC card issuance system that issues an IC card by writing issuance data into a memory for the IC card having at least the memory incorporated therein.

2. Description of the Related Art

Recently, as a portable storage medium, there has been utilized in various industrial fields a so called IC card having incorporated therein an IC chip having a nonvolatile data memory and a CPU (central processing unit) for controlling the memory.

An IC card of such type is generally issued by using an IC card issuance device stored in a card issuance company or the like. In this IC card issuance device, IC command data required for functioning an IC card, magnetic encode data, print data and the like are generated by a host computer, and these items of data are sequentially transmitted to an issuance machine. The IC command data is inputted to the IC chip incorporated in the IC card; the magnetic encode data is magnetically recorded on the surface of the IC card, and the print data is printed on the surface of the IC card.

A processing executed in the IC chip in response to the IC command data relevant to the IC chip incorporated in the IC card is one of the most important processings in IC card issuance processing. The IC chip in the IC card comprises means for outputting information indicative of whether or not processing of individual IC command data transmitted has been normally carried out and the issuance device comprises means for judging whether or not command data has been normally transmitted based on output information from the IC chip.

In general, in the IC card issuance device of such type, it is required to prevent the same IC cards from being doubly issued. For example, this device has a double issuance preventing function as disclosed in Japanese Patent Application KOKAI Publication No. 1-18892. That is, in an IC card issuance device disclosed in Japanese Patent Application KOKAI Publication No. 1-18892, an issued-data recording section is provided in an issuance file of a host computer; flag data indicating the completion of issuance is added to issued issuance data in the issuance file; and the flag data indicating the completion of this issuance is checked, thereby preventing double issuance.

However, in the conventional IC card issuance device described above, in the case where there is an IC card judged to be NG during appearance check such as print data after the end of issuance and emboss data, it has been necessary to manually creating an issuance file of the IC card, thereby reissuing the IC card. That is, in such a case, an operator visually recognizes ID (for example, membership number) of an IC card to be reissued from the appearance of print data, emboss data and the like. Then, the operator operates a master file of a host computer, for example, rewrites issued flag data that corresponds to the IC card into unissued flag data, and reissues the IC card at the IC card issuance device.

In addition, in the case where an IC card is used by an owner, whereby a print image on the IC card surface is unclear or the IC card is damaged, making it necessary to reissue the IC card, in the conventional IC card issuance device, as described above, it has been necessary for the operator to visually recognize ID of the IC card to be reissued from print data, emboss data and the like, thereby reissuing issued flag data after rewritten into unissued flag data, or alternatively, to newly create an issuance file of an IC card to be newly reissued.

However, in the case where the operator incorrectly recognizes ID of the IC card to be reissued, an IC card other than that to be reissued is issued. In this case, there occurs duplicate issuance of the IC card that is not required to reissue.

BRIEF SUMMARY OF THE INVENTION

Accordingly, it is a primary object of one embodiment of the present invention to provide an IC card issuance system capable of reliably preventing reissuing, i.e., incorrect issuance of an IC card other than that to be reissued.

The IC card issuance system according to the present invention comprises: an issuance file which stores each item of issuance data during issuance of each issued IC card; an identification information readout command file which stores a readout command for reading out the identification information from the issued IC card; an identification information readout section which reads out the identification information from an issued first IC card by using the identification information readout command file; an issuance data extracting section which extracts from the issuance file, issuance data that corresponds to identification information read out by the identification information readout section; and a card issuance section which issues a new second IC card identical to the issued first IC card by writing the issuance data extracted by the issuance data extracting section into a memory of an unissued IC card.

Issuance data containing card specific ID is recorded in a memory, a print image and magnetic data each are recorded on a surface, and a number of novel IC cards are fabricated. For example, in the case where an abnormally printed IC card has been found during appearance check, an ID recorded in the memory for the abnormally printed IC card is read by the identification information readout section. Based on this ID, the issuance data corresponding to the ID is extracted from an issuance file of a terminal device by the issuance data extracting section. The issuance data includes various data such as print data and magnetic data as well as the above ID. A card issuance section fabricates a new IC card based on the extracted issuance data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIG. 1 is a block diagram schematically showing an exemplary configuration of an IC card issuance system according to a first embodiment of the invention;

FIG. 2 is a block diagram schematically showing an exemplary configuration of an IC card;

FIG. 3 is a view showing exemplary contents of an issuance file according to the first embodiment;

FIG. 4 is a view showing exemplary contents of an ID readout command data file according to the first embodiment;

FIG. 14 is a schematic view showing exemplary contents of a hard disk unit after storing issuance data on the IC card to be reissued according to the first embodiment;

FIG. 15 is a schematic view showing exemplary contents of a hard disk unit according to a second embodiment of the invention;

FIG. 16 is a view showing exemplary contents of a card type readout command data file according to the second embodiment;

FIG. 17 is a view showing exemplary contents of a card type/ID readout command data file correlation table according to the second embodiment;

FIG. 20 is a schematic view schematically showing an entire configuration of an IC card issuance system according to a third embodiment of the invention;

FIG. 21 is a view showing exemplary contents before IC card issuance of an issuance file according to the third embodiment;

FIG. 22 is a view showing exemplary contents after IC card issuance of an issuance file according to the third embodiment;

FIG. 23 is a block diagram schematically showing a configuration of an IC card issuance device in a reissuing center according to the third embodiment;

FIG. 30 is a schematic view schematically showing an entire configuration of an IC card issuance system according to a fifth embodiment of the invention;

FIG. 32 is a view showing exemplary contents before IC card issuance of an issuance file according to the fifth embodiment;

FIG. 33 is a view showing exemplary contents after IC card issuance of an issuance file according to the fifth embodiment;

FIG. 36 is a view showing a display example of an IC card design selection screen according to the fifth embodiment.

DETAILED DESCRIPTION OF THE INVENTION

Figure 5:
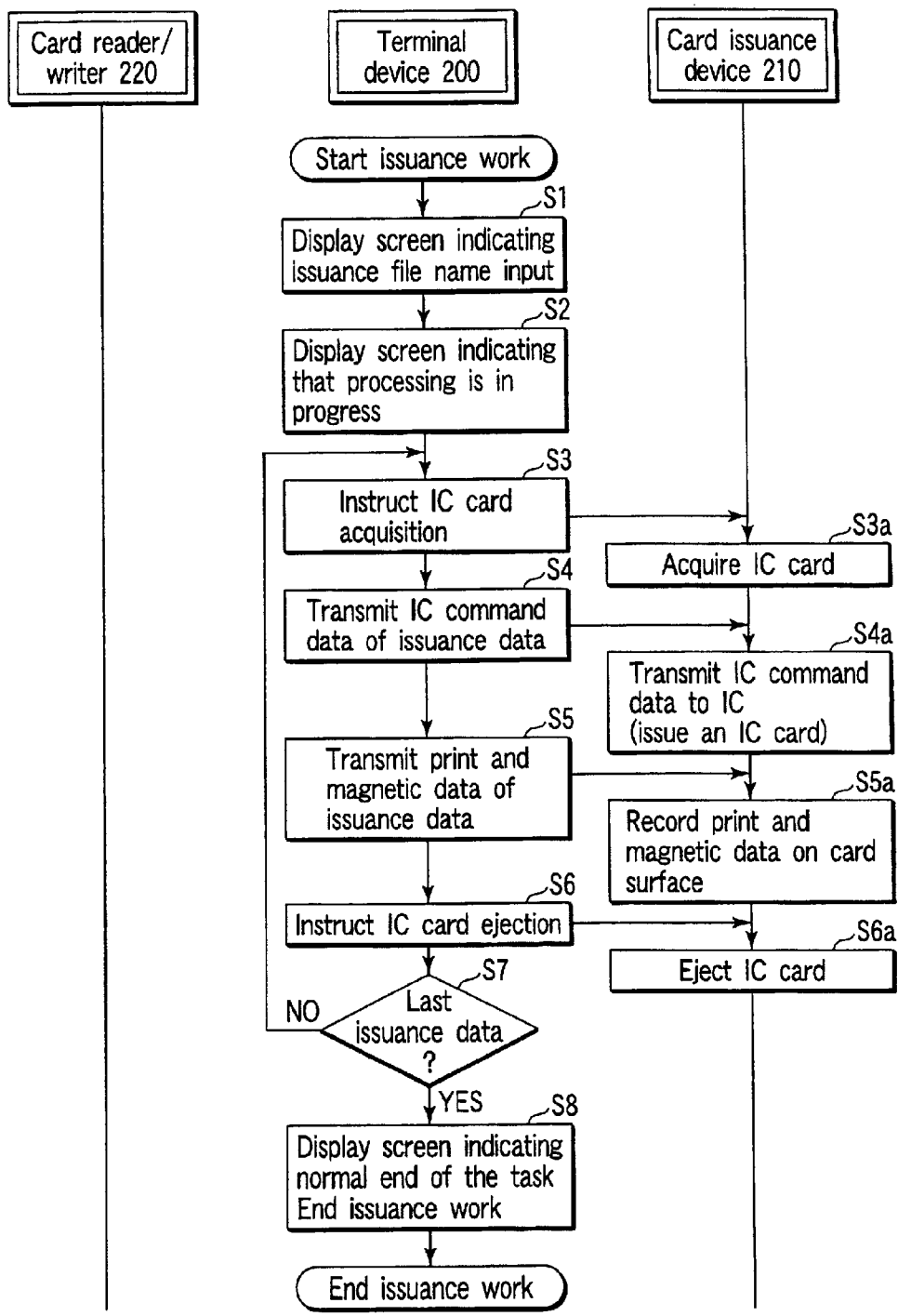
FIG. 5 is a flowchart illustrating IC card issuance processing according to the first embodiment.

Hereinafter, preferred embodiments of the present invention will be described with reference to the accompanying drawings.

First, a first embodiment of the invention will be described here.

FIG. 1 schematically shows an exemplary configuration of an IC card issuance system according to the first embodiment. In FIG. 1, this IC card issuance system comprises a terminal device 200 and a card issuance device 210 that are connected to each other via a cable 205. The terminal device 200 is a personal computer (PC), for example, and comprises a terminal main body 201, a hard disk unit (HDD) 202 as storage means, a keyboard 203 as input means, and a display 204 as display means.

The terminal main body 201 comprises a CPU (central processing unit) 201a as a computing section and a memory 201b as storage means. The CPU 201a controls the entirety of this terminal device. In addition, the terminal main body 201 is connected to a hard disk unit 202, a keyboard 203, and a display 204, respectively.

The hard disk unit 202 stores: a first issuance file F11 having issuance data stored therein; a second issuance file F12 having issuance data stored therein similarly; a first ID readout command data file F13 having ID readout command data stored therein; and a second ID readout command data file F14 having ID readout command data stored therein similarly or the like.

The card issuance device 210 comprises a card reader/writer 206, a card printer 207, a magnetic encoder 208, a card supply section 211, and a stacker 212. Unissued IC cards 100 to be issued, which have been set at the card supply section 211, are sequentially acquired in the card reader/writer 206, the card printer 207, and the magnetic encoder 208 one by one, are subjected to respective processings, and are ejected to a card stacker 212.

A card reader/writer 220 is connected to the terminal device 200, and a variety of data exchanges are carried out between the terminal device 200 and an IC card 100a via this card reader/writer 220.

The IC card 100 comprises, for example, a contact section 105, an IC chip 106, and a magnetic stripe section 107, as shown in FIG. 2. The IC chip 106 comprises a control element 101, a data memory 102, a working memory 103, and a program memory 104. The contact section 105 and the IC chip 106 are integrally provided as modules, and are embedded in an IC card main body.

The control element 101 is a CPU, for example. This control element 101 controls the entire IC card. The data memory 102 is a nonvolatile memory, whose storage contents are erasable, and uses an EEPROM (electrically erasable and programmable ROM), for example. The working memory 103 is a memory which temporarily stores processing data or the like on the control element 101, and uses a RAM (random access memory), for example. The program memory 104 is a memory which stores a program or the like of the control element 101, and uses a mask ROM (read only memory), for example. The contact section 105 is a portion which electrically contacts the card reader/writer 206 of the card issuance device 210. A variety of data exchanges are carried out between the card issuance device 210 and the IC card 100 via this contact section 105 and card reader/writer 206.

The card reader/writer 206 of the card issuance device 210 carries out a variety of data exchanges with the IC card 100 via the contact section 105 of the IC card 100. In addition, the card reader/writer 206 magnetically records a variety of data relevant to a magnetic stripe section 107 of the IC card 100, and reads out a variety of data magnetically recorded in the magnetic stripe section 107.

The card issuance device 210 comprises functions [1] to [4] shown below:

[1] a function (card reader/writer 206) that transmits to the control element 101 via the contact section 105 of the IC card 100, IC command data delivered from the terminal device 200 to the card issuance device 210;

[2] a function (card reader/writer 206) that transmits a response delivered from the control element 101 of the IC card, from the card issuance device 210 to the terminal device 200 via the contact section 105;

[3] a function (card printer 207) that prints on the surface of the IC card 100, print data delivered from the terminal device 200 to the card issuance device 210; and

[4] a function (magnetic encoder 208) that magnetically records magnetic encode data delivered from the terminal device 200 to the card issuance device 210 in the magnetic stripe section 107 of the IC card 100.

FIG. 3 shows an exemplary data structure of a first issuance file F11 (which is similar to that of the second issuance file F12). The first issuance file F11 is composed of print data, write command data for IC card and the like, for example. In an example shown in FIG. 3, print data is defined in item 1 and item 2; IC command data is defined in item 3, item 4, item 5, and item 6. That is, as shown in FIG. 3, the above issuance file is composed of a record group (individual data group) in which individual data such as card owner's name in Chinese characters (item 1), membership numbers that is identification information (ID) (item 2), membership number write command data (item 3), validity write command data (item 4), correlation password setting command data (item 5), and encoding key setting command data (item 6) are defined as one record. Such one record is issuance data on one IC card.

FIG. 4 shows an exemplary data structure of a first ID readout command data file F13 (which is similar to a second ID readout command data file F14). The first ID readout command data file F13 is composed of readout command data and the like for an IC card. In an example shown in FIG. 4, PIN (password number) correlation IC command data required for ID readout is defined in item 1; directory selection IC command data required for ID readout is defined in item 2; EF selection IC command data for selecting an EF (elementary file) in a selected directory is defined in item 3; and ID readout IC command data is defined in item 4.

Now, IC card issuance processing according to the first embodiment in such configuration will be described with reference to a flowchart shown in FIG. 5.

Figure 6:
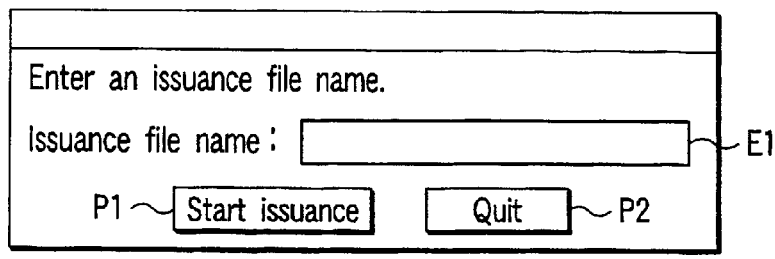
FIG. 6 is a view showing a display example of a screen indicating file name input according to the first embodiment.

First, the terminal device 200 displays a screen indicating file name input as shown in FIG. 6 on the display 204 (step S1). On this file name input screen, an issuance file name input area E1, an issuance start button P1, and a quit button P2 are provided.

An operator inputs in an input area E1 a file name (for example, issuance file 1) of the issuance file having stored therein issuance data on an IC card to be issued, based on the display contents of the display 204. Then, the operator clicks the issuance start button P1, whereby the terminal device 200 starts issuance processing, and clicks the quit button P2, whereby processing terminates.

Figure 7:
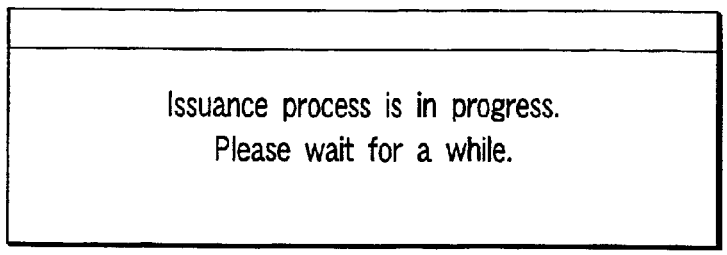
FIG. 7 is a view showing a display example of a screen indicating that issuance processing is in progress according to the first embodiment.

That is, when the issuance start button P1 is clicked, the terminal device 200 displays a screen indicating that issuance processing is in progress as shown in FIG. 7 on the display 204 (step S2).

When the terminal device 200 displays the screen indicating that issuance processing is in process, the terminal device instructs the card issuance device 210 to acquire the IC card 100 (step S3). When the IC card 100 is acquired by the card reader/writer 206 (step S3a), the terminal device 200 transmits IC command data on a starting record (Record #1) of an issuance file having an issuance file name inputted by the operator to the control element 101 of the IC card 100 via the card reader/writer 206 of the card issuance device 210 (step S4). The control element 101 of the IC card 100 writes data (data defined in items 3 to 6 in FIG. 3) in an IC command for the transmitted starting record (Record #1) in a predetermined region for the data memory 102, (step S4a).

After transmitting the IC command data, the terminal device 200 transmits print data and magnetic data on the starting record (Record #1) of the issuance file having an inputted issuance file name to the card printer 207 and magnetic encoder 208 of the card issuance device 210 (step S5). The card printer 207 and magnetic encoder 208 record the print data and magnetic data on the surface of the IC card 100 (step S5a).

Next, the terminal device 200 instructs the card issuance device 210 to eject the IC card 100 (step S6), and the card issuance device 210 ejects to the stacker 212 the IC card 100 of which issuance processing is terminated (step S6a).

After the terminal device 200 has instructed ejection of the IC card 100, the terminal device checks whether or not a next record is present in the issuance file having an inputted issuance file name (step S7). In the case where the next record is present, processing reverts to the step S3 at which issuance processing for a next record (Record #2) is started.

Figure 8:
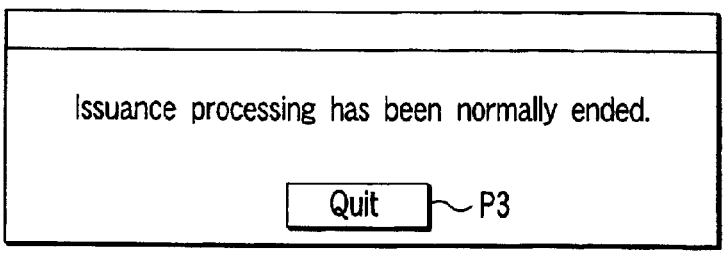
FIG. 8 is a view showing a display example of a screen indicating normal end of the task according to the first embodiment.

In the case where there is no next record as a result of check at the step S7, the terminal device 200 displays a screen indicating normal end of the task as shown in FIG. 8 on the display 204 (step S8). A quit button P3 is provided on this screen indicating normal end of the task, and the operator clicks this quit button P3, whereby all processing terminates.

Figure 9:
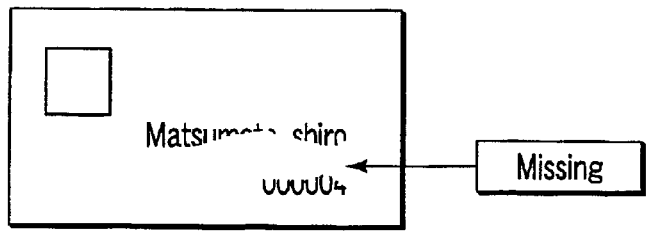
FIG. 9 is a view illustrating an IC card to be reissued.

Among the thus issued IC cards, for example, a print image on the card surface includes missing print failures, as shown in FIG. 9, such an IC card must be reissued.

In the first embodiment, issuance data on an IC card to be reissued is judged based on ID read out from the IC card, and the IC card is reissued in accordance with the flowchart shown in FIG. 5.

Figure 10:
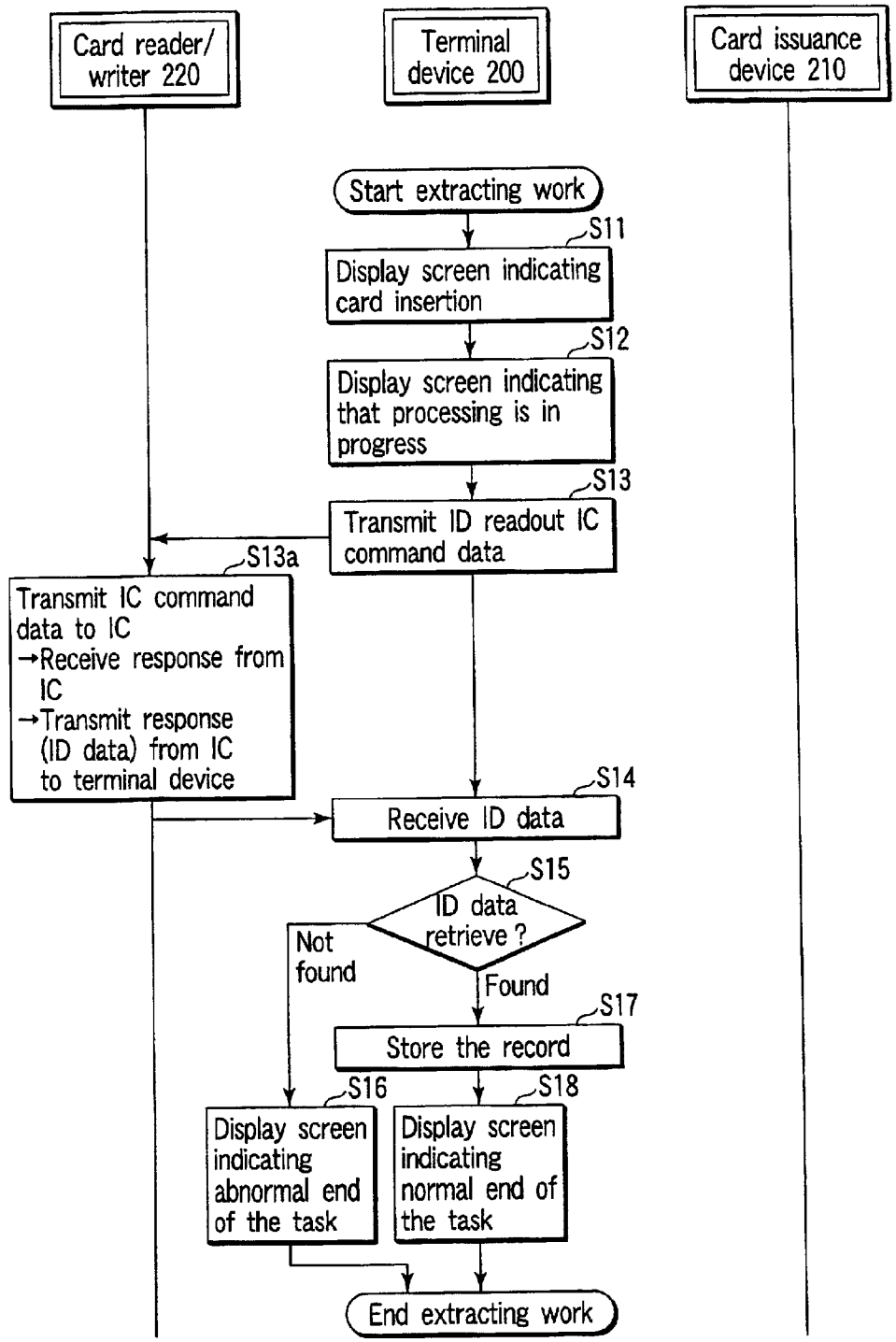
FIG. 10 is a flowchart illustrating processing for extracting and outputting issuance data on an IC card to be reissued according to the first embodiment.

Hereinafter, processing for retrieving and outputting issuance data on an IC card to be reissued according to the first embodiment will be described with reference to a flowchart shown in FIG. 10.

Figure 11:
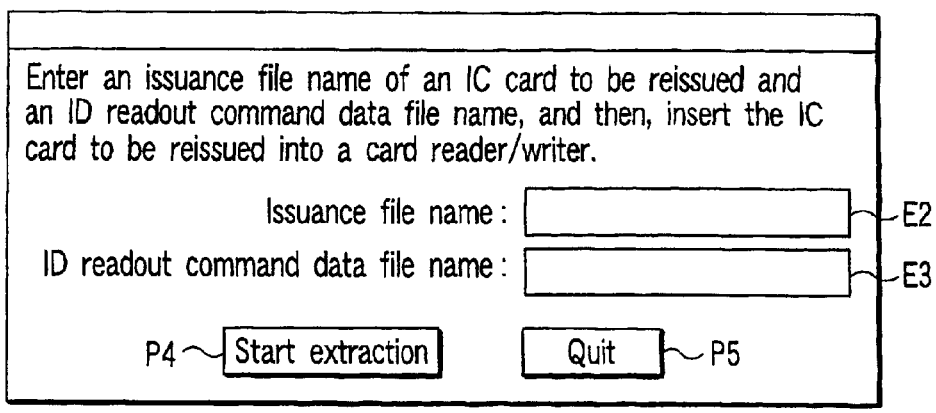
FIG. 11 is a view showing a display example of a screen indicating card insertion according to the first embodiment.

First, the terminal device 200 displays a screen indicating card insertion as shown in FIG. 11 on the display 204 (step S11). On this card insertion screen, an issuance file name input area E2, an ID readout command data file name input area E3, an extracting start button P4, and a quit button P5 are provided.

The operator inputs a file name of an issuance file having stored therein issuance data on an IC card to be reissued and an ID readout command data file name, based on the display contents of the display 204, inserts the IC card 100*a* to be reissued into the card reader/writer 220, and clicks the extracting start button P4. The terminal device 200 starts extracting processing in response to this clicking, and terminates processing in response to the clicking of the quit button P5.

Figure 12:
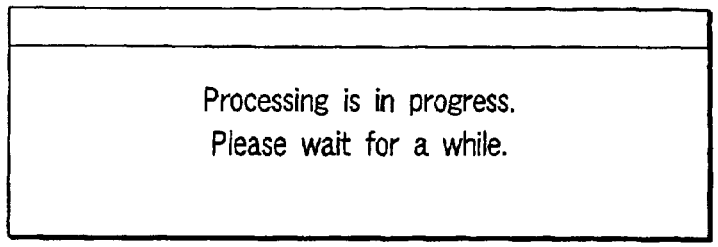
FIG. 12 is a view showing a display example of a screen indicating that extracting processing is in progress according to the first embodiment.

That is, when the extracting start button P4 is clicked, the terminal device 200 displays a screen indicating that processing is in progress as shown in FIG. 12 on the display 204 (step S12).

When the terminal device 200 displays the screen indicating that processing is in progress, the terminal device transmits to the control element 101 of the IC card 100*a* via the card reader/writer 220, the ID readout IC command data (refer to FIG. 4) in an ID read command data file having the inputted ID readout command data file name (step S13). The control element 101 of the IC card 100*a* reads out membership numbers as ID from the data memory 102 based on the transmitted ID readout IC command data, and transmits the read out ID to the terminal device 200 via the card reader/writer 220 (step S13*a*).

After receiving ID (step S14), the terminal device 200 retrieves the corresponding ID from the issuance file having an issuance file name inputted by the operator (step S15). In the case where there is no record having ID that coincides with the received ID, the terminal device 200 displays a screen indicating abnormal end of the task on the display 204 (step S16), and terminates extracting processing.

Figure 13:
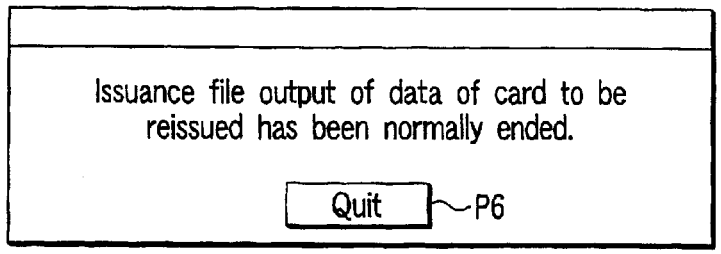
FIG. 13 is a view showing a display example of a screen indicating normal end of the task according to the first embodiment.

At the step S15, in the case where there is a record having ID that coincides with the received ID, the terminal device 200 reads out that record from the issuance file, stores the read out record in a hard disk unit 202 (step S17), and displays a screen indicating normal end of the task as shown in FIG. 13 (step S18) on the display 204. The quit button P6 is provided on this screen indicating normal end of the task. The operator clicks this quit button P6, whereby all processing terminates.

The thus stored file for issuance data on the IC card 100*a* to be reissued, as shown in FIG. 14, is stored as a reissuing file F15 in the hard disk unit 202 of the terminal device 200. Therefore, in the previously described issuance processing shown in FIG. 5, a file name of the reissuing file F15 (reissuing file 1,000004) is inputted as an issuance file name, whereby an IC card can be reissued.

According to the first embodiment described above, ID of the IC card to be reissued is read out from the IC card, and a record having ID that coincides with the read out ID is outputted to be retrieved from the issuance file. Based on this outputted record (issuance data), an IC card is reissued, whereby duplicate issuance or incorrect issuance can be avoided.

Although the foregoing description has given a case where card specific identification information is read as ID from the IC card, this ID may be read out from a bar code in the case where the magnetic stripe 107 is provided on the card surface or in the case where a bar code is printed on the card surface.

Now, a second embodiment of the invention will be described here.

The second embodiment is different from the first embodiment in processing for selecting an ID readout command data file from information read out from an IC card. Because of this, IC card issuance processing is identical to that according to the previously described first embodiment (flowchart in FIG. 5). A duplicate description is omitted here.

FIG. 15 shows contents of a hard disk unit 202 of a terminal device 200 according to the second embodiment. The hard disk unit 202 stores: first and second issuance files F11 and F12 shown in FIG. 1; first and second ID readout command data files F13 and F14; a card type readout command data file F16; and a card type/ID readout command data file correlation table F17.

FIG. 16 shows exemplary contents of the card type readout command data file F16. The card type readout command data file F16 is composed of IC command data, for example. In an example shown in FIG. 16, EF selection IC command data for selecting an EF (elementary file) required for readout of card type information is defined in item 1, and IC command data for card type information readout is defined in item 2. This card type differs depending on each credit company, each bank or the like which issues a card. In IC cards of different card types, ID readout command data are slightly different. Therefore, it is required to change ID readout command data according to card type. An issuance file is created for each card type, each record includes each elementary file, and such elementary file includes card type information.

FIG. 17 shows exemplary contents of the card type/ID readout command data file correlation table F17. The card type/ID readout command data file correlation table F17 is composed of card type information and the corresponding ID readout data file name. In an example shown in FIG. 17, an ID readout command data file name "first ID readout command data file" is defined as card type information "010", and an ID readout command data file name "second ID readout command data file" is defined as card type information "020".

Figure 18:
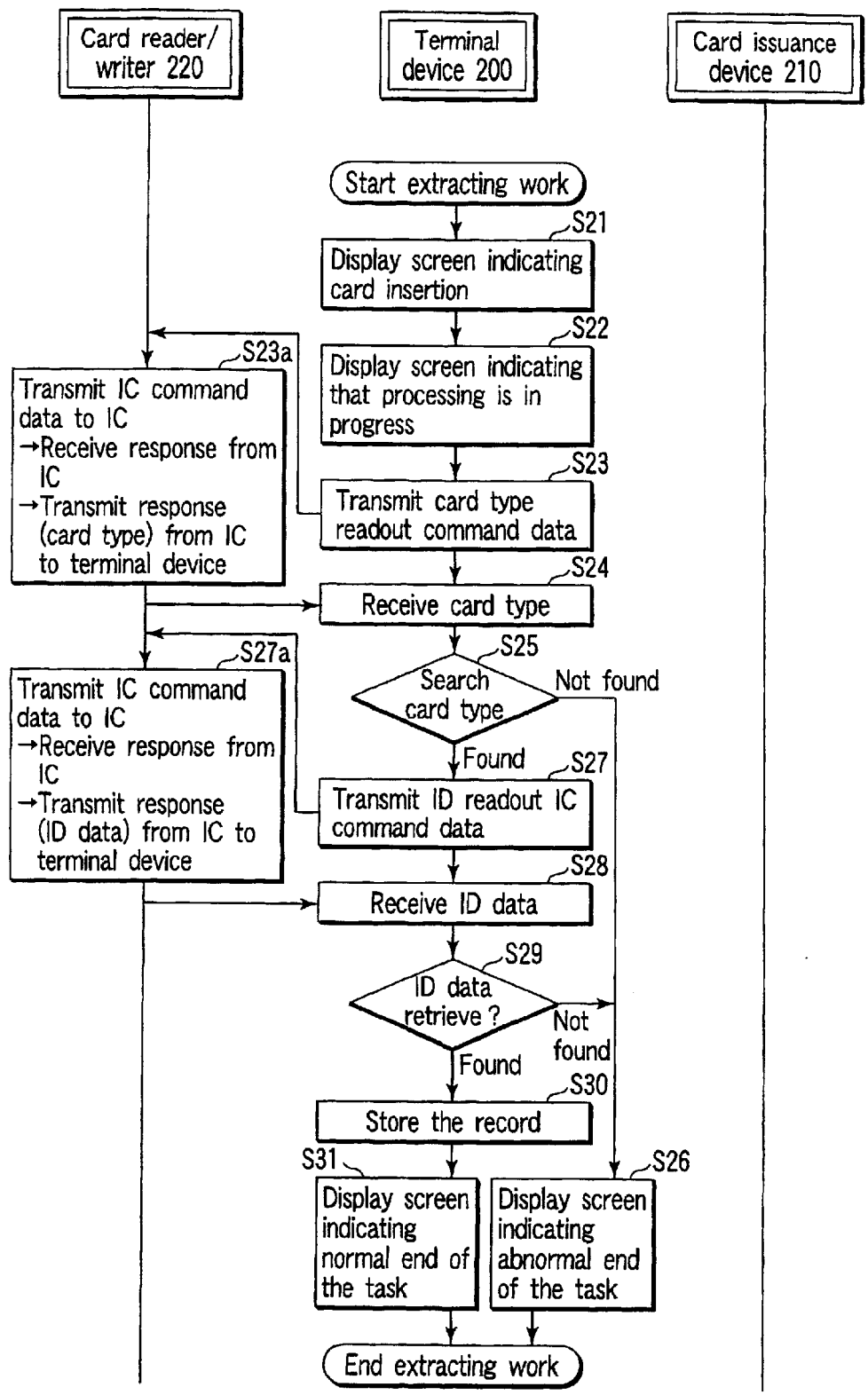
FIG. 18 is a flowchart illustrating processing for extracting and outputting issuance data on an IC card to be reissued according to the second embodiment.

Now, processing for retrieving and outputting issuance data on an IC card to be reissued according to the second embodiment will be described with reference to a flowchart shown in FIG. 18.

Figure 19:
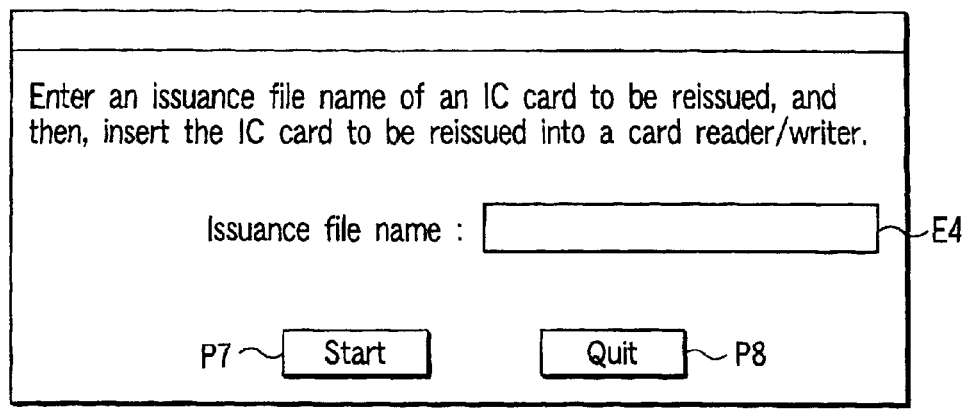
FIG. 19 is a view showing a display example of a screen indicating card insertion according to the second embodiment.

First, the terminal device 200 displays a screen indicating card insertion as shown in FIG. 19 on the display 204 (step S21). An issuance file name input area E4, the extracting start button P7, and a quit button P8 are provided on this card insertion screen.

An operator inputs a file name of an issuance file having stored issuance data on an IC card to be reissued therein, based on the display contents of the display 204. Then, the operator inserts an IC card 100a to be reissued into a card reader/writer 220, and clicks the extracting start button P7. The terminal device 200 starts extracting processing in response to this clicking, and terminates all processing in response to the clicking of the quit button P8.

That is, when the extracting start button P7 is clicked, the terminal device 200 displays a screen indicating that processing is in progress as shown in FIG. 12 on the display 204 (step S22).

Next, the terminal device 200 transmits card type readout command data to a control element 101 of the IC card 100a via the card reader/writer 220 (step S23). The control element 101 of the IC card 100a reads out card type information from a data memory 102 based on the transmitted card type readout command data, and transmits the read out information to the terminal device 200 via the card reader/writer 220 (step S23a).

The terminal device 200 receives card type information transmitted via the card reader/writer 220 (step S24). Next, the terminal device 200 retrieves the ID readout command data file name that corresponds to the card type information from the card type/ID readout command data file correlation table F17 (refer to FIG. 17) (step S25). In the case where there is no ID readout command data file name that corresponds to the received card type information, the terminal device 200 displays a screen indicating abnormal end of the task on the display 204 (step S26), and terminates extracting processing.

At the step S25, in the case where there is an ID readout command data file name that corresponds to the received card type information, the terminal device 200 transmits the ID readout IC command data in a file having that file name to the control element 101 of the IC card 100a via the card reader/writer 220 (step S27). The control element 101 of the IC card 100a reads out ID as identification information from the data memory 102 based on the transmitted ID readout IC command data, and transmits the read out ID to the terminal device 200 via the card reader/writer 220 (step S27a).

When the terminal device 200 receives the ID transmitted via the card reader/writer 220 (step S28), the terminal device retrieves the corresponding ID from an issuance file having the issuance file name inputted by the operator (step S29). In the case where there is no record having an ID that coincides with the received ID, the terminal device 200 displays a screen indicating abnormal end of the task on the display 204 (step S26), and terminates extracting processing.

At the step S29, in the case where there is a record having an ID that coincides with the received ID, the terminal device 200 reads out that record from the issuance file, and stores the record in the hard disk unit 202 (step S30). Then, the terminal device displays a screen indicating normal end of the task as shown in FIG. 13 on the display 204 (step S31). A quit button P6 is provided on this screen indicating normal end of the task. The operator clicks this quid button P6, whereby all processing terminates.

The thus outputted Issuance data on the IC card 100a to be reissued is stored as a reissuing file F15 in the hard disk unit 202 of the terminal device 200, as shown in FIG. 14. Therefore, in the previously described issuance processing shown in FIG. 5, a file name of the reissuing file F15 is inputted as an issuance file name, an IC card can be reissued.

According to the second embodiment described above, card type information on an IC card to be reissued is read out from the IC card, and an ID readout command data file is selected. Then, an ID is read out from the IC card by using command data on the selected file, a record having an ID that coincides with the read out ID is outputted after retrieved from the issuance file. IC card reissuing is carried out based on the thus outputted record (issuance data), whereby duplicate issuance or incorrect issuance can be avoided.

Although the foregoing description has given a case of reading card type information from an IC card has been described, the card type information may be read out from a bar code in the case where a magnetic stripe 107 is provided on the card surface or in the case where a bar code is printed on the card surface.

In addition, although the above description has given a case of reading card type information from an IC card, and selecting a command data file for reading out an ID from the card type information, an ID readout command data file may be selected from the characteristics (such as header or extension) of an issuance file name. By any method, there can be provided various types of ID card files to be reissued.

Now, a third embodiment of the invention will be described here.

FIG. 20 shows an entire configuration of an IC card issuance system according to the third embodiment. In the third embodiment, for example, a card issuer (card issuing company) C issues an IC card, and delivers it to a user D. Then, an IC card is reissued at a reissuing center E connected to the card issuer C via a network (communication line) F upon a request from the user D. The user request used here denotes a reissuing request that occurs when the user requires a plurality of IC cards such as a point card in which a discount point at shopping is added or a room card used as a room key or when the user requires a new IC card because the card surface becomes dirty or damaged.

An IC card issuing device of the card issuer C has a configuration similar to that shown in FIG. 1 described above. An IC card issuing device of the reissuing center D is configured as shown in FIG. 23 described later.

FIG. 21 shows exemplary contents of an issuance file according to the third embodiment, i.e., an issuance file F11 (F12) in the IC card issuing device of the card issuer C. The issuance file according to the third embodiment is different from that of the first embodiment described above in that issuance count is defined in item 6.

For example, in an item defining issuance count, the default value is set to "Num=0". However, as described later, the setting is rewritten to "Num=1" by the card issuer C after issuance has been completed. This count is increased by 1 every time a reissuing request from the reissuing center E is made. When a second reissuing request is made from the reissuing center E, the setting is rewritten to Record #14 in FIG. 22, and is rewritten to "Num=3", as shown in item 6.

FIG. 23 schematically shows a configuration of an IC card issuing device at the reissuing center E according to the third embodiment. The IC card issuing device of the reissuing center E is different from that according to the second embodiment (FIG. 15) described above in that the first and second issuance files F11 and F12 are not stored in a hard disk 302 of a terminal device 300.

In the third embodiment, when issuance data is outputted to an IC card to be reissued, the re-issuer E receives ID data from the card issuer C, and records the corresponding record in the IC card.

Figure 24:
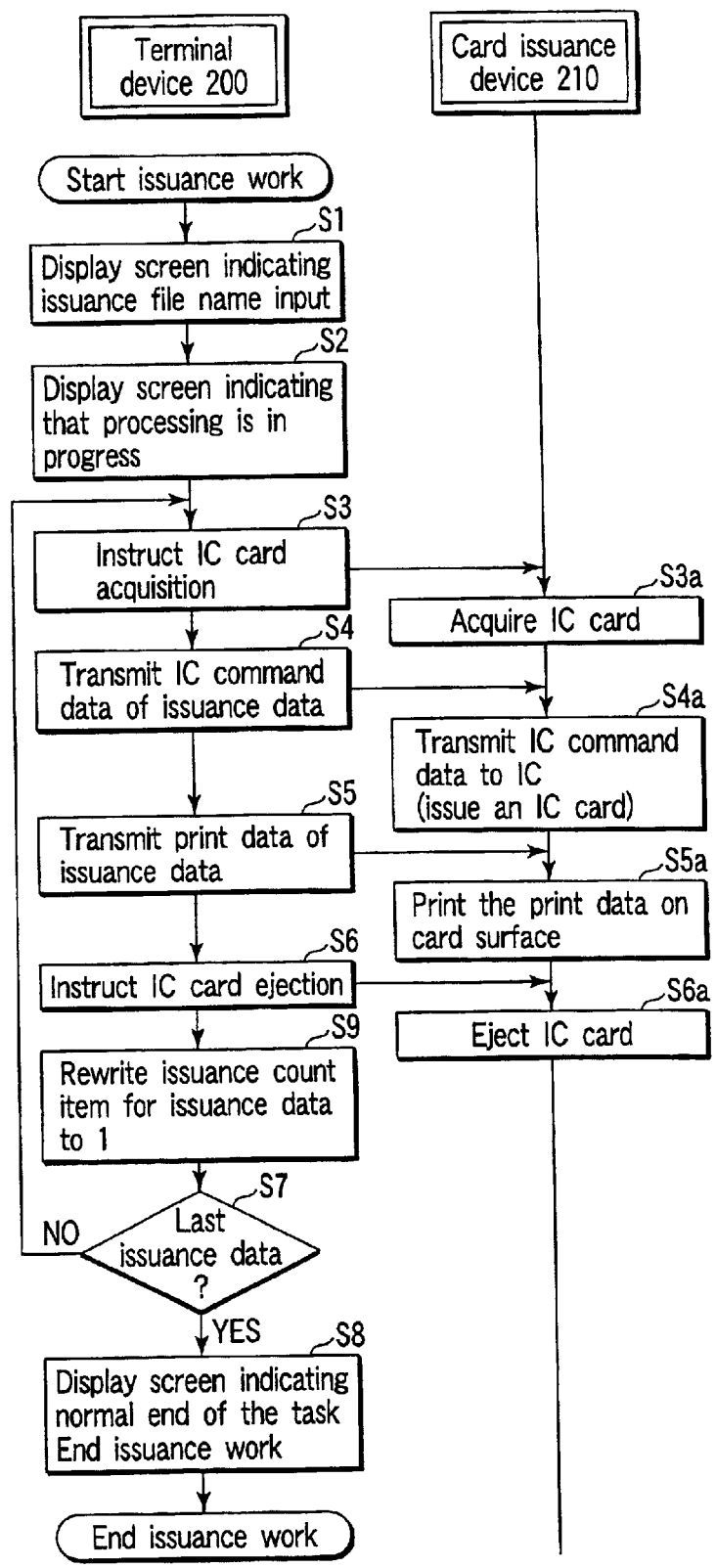
FIG. 24 is a flowchart illustrating IC card issuance processing according to the third embodiment.

Now, IC card issuance processing according to the third embodiment will be described with reference to a flowchart shown in FIG. 24. The issuance processing according to the third embodiment is different from that according to the first embodiment (FIG. 5) described above in that rewriting in item for defining the issuance count of issuance data is carried out.

That is, the terminal device 200 of the issuer C instructs IC card ejection after print data has been transmitted (step S6), and then, carries out rewriting in item for defining the issuance count of issuance data on records used for issuance. That is, the item defining issuance count "0" is increased to "1". In the case where there is a next record in an issuance file (step S7), processing reverts to the step S3 at which issuance processing for the next record (Record #2) is started.

Figure 26:
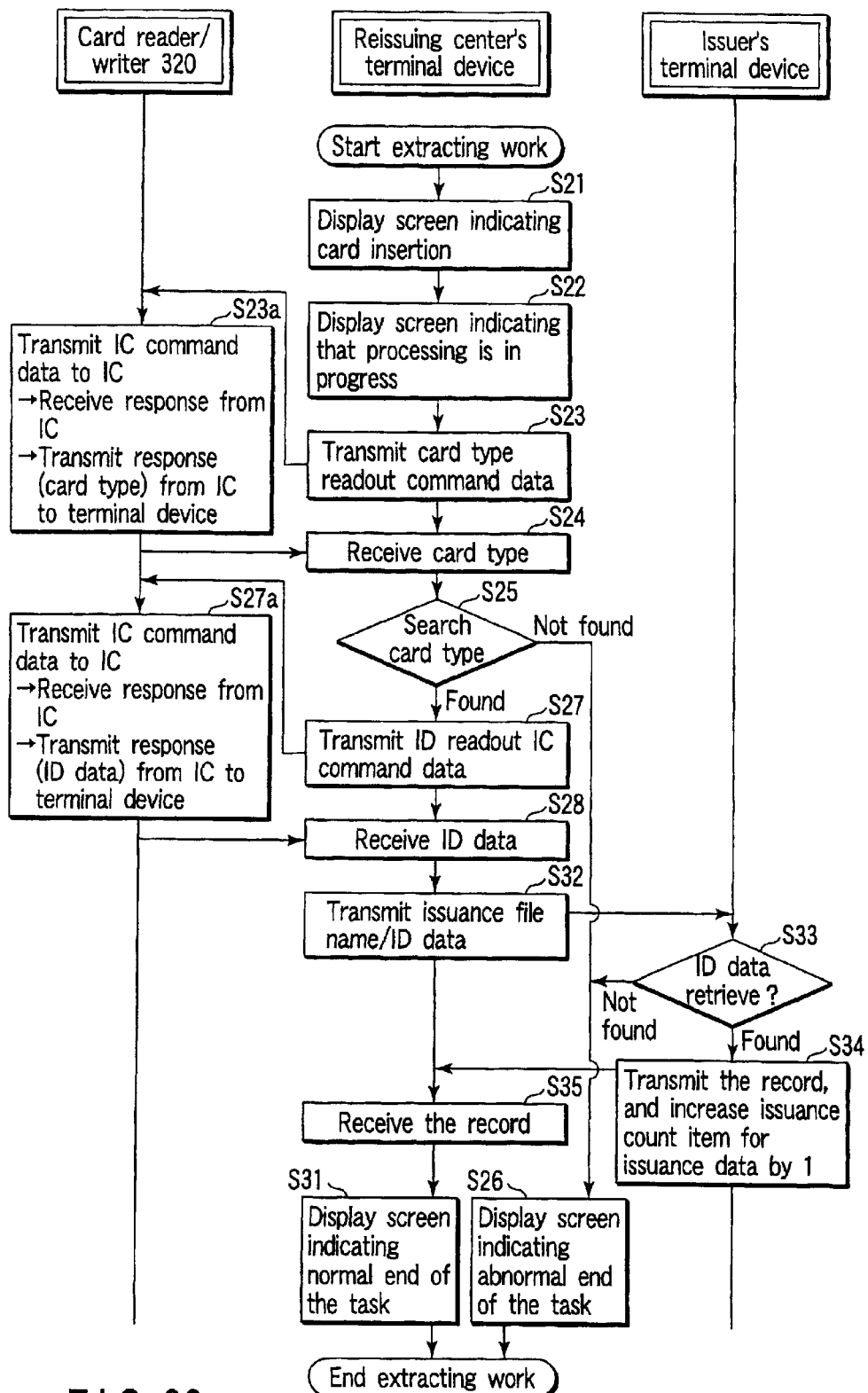
FIG. 26 is a flowchart illustrating processing for extracting and outputting issuance data on an IC card to be reissued according to the third embodiment.

Now, processing for retrieving and outputting issuance data on an IC card to be reissued according to the third embodiment will be described with reference to a flowchart shown in FIG. 26. In the third embodiment, processing after an ID has been received from an IC card at the step S28 is different as compared with the second embodiment (FIG. 18) described above.

That is, when the terminal device 300 of the reissuing center E receives an ID from an IC card (step S28), the terminal device transmits the ID and inputted issuance file name to the terminal device 200 of the card issuer C (step S32). The terminal device 200 of the card issuer C having received them retrieves the corresponding ID from an issuance file of the inputted issuance file name (step 33). In the case where there is no record having an ID that coincides with the received ID, the terminal device displays a screen indicating abnormal end of the task on the display 204 (step S26), and terminates extracting processing.

At the step S33, in the case where there is a record having an ID that coincides with the received ID, the terminal device 200 extracts that record from the issuance file, and transmits the extracted record to the terminal device 300 of the reissuing center E (step S34). At this time, in the terminal device 200 of the card issuer C, the value of the record issuance count in the issuance file (that is, issuance count) is increased by 1 (step S34).

When the terminal device 300 of the reissuing center E receives a record from the terminal device 200 of the card issuer C (step S35), the terminal device 300 stores the record in a hard disk unit 302, and displays a screen indicating normal end of the task as shown in FIG. 13 on a display 304 (step S31). A quit button P6 is provided on this screen indicating normal end of the task, and the operator clicks this quit button P6, whereby all processing terminates.

Figure 25:
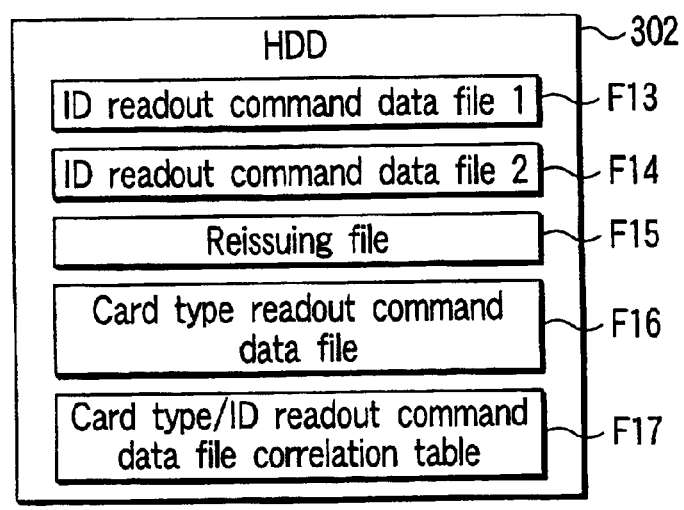
FIG. 25 is a schematic view showing exemplary contents of a hard disk unit in the reissuing center.

The thus outputted file for issuance data of the IC card 100a to be reissued is stored as an reissuing file F15, as shown in FIG. 25, in the hard disk unit 302 of the terminal device 300 of the reissuing center E. Then, at the reissuing center E, an IC card of the previously described issuer C is reissued in accordance with a flowchart shown in FIG. 24. At this time, a file name of the reissuing file F15 is inputted as a file name of the issuance file, whereby a target IC card can be reissued.

According to the third embodiment described above, the terminal device of the reissuing center reads out card type information on an IC card to be reissued from the IC card, and selects an ID readout command data file. Then, this terminal device reads out an ID from the IC card by using command data on the selected file, and transmits the read out ID to the terminal device of the card issuer. The card issuer retrieves a record having the coinciding ID from the issuance file of the terminal device, and transmits the record to the terminal device of the reissuing center. The reissuing center stores the record in the hard disk unit, and reissue an IC card based on the stored record (issuance data). Doing this can avoid incorrect issuance of an IC card.

In addition, card type information is read out from an IC card, whereby type of the IC card to be reissued can be recognized, and reissuing processing can be carried out for each card type. Further, card issuance count (i.e., issuance count) can be managed by recording an issuance count value.

Although the foregoing description has given a case of reading an ID that is card specific identification information and card type information from an IC card, in the case where a magnetic stripe 107 is provided on the card or in the case where a bar code is printed on the card surface, such ID and card type information may be read out from such bar code.

In addition, although the foregoing description has given a case of selecting an ID readout command data file at the reissuing center, the card type information read out at the reissuing center is transmitted to the card issuer, and an ID readout command data file is selected at the terminal device of the card issuer so that command data on the selected file may be transmitted to the terminal device of the reissuing center.

Further, in the case where an issuance file is rewritten in a hard disk unit at the card issuer's terminal device described above, the number of reissued IC cards or the fact that reissuing has been carried out is notified to the IC card owner's address by mail or the like, whereby reissuing against the card owner's intention can be detected.

Now a fourth embodiment of the invention will be described here.

The fourth embodiment is different as compared with the first embodiment in that, in the case of reissuing, and the issuance count value (issuance flag) of a record that falls into the IC card ID is rewritten into "0" (Num=0); an IC card whose issuance count value (issuance flag) is non-zero (other than Num=0) is unissued during issuance; and in a screen displayed at the end of processing of an IC card to be reissued. A system configuration and another display screen of the display 204 are similar to those according to the first embodiment, and an issuance file is similar to that according to the third embodiment.

First, an example of an issuance file according to the fourth embodiment is shown in FIG. 21. The issuance file according to the fourth embodiment is substantially identical to that according to the third embodiment described above. The fourth embodiment is different as compared with the third embodiment in that item 6 (issuance count item) is used as an issuance flag (information on completion of issuance) indicating the completion of issuance.

For example, in an issuance flag item, the default value is "Num=0" which indicates that no issuance occurs, and is rewritten to "Num=1" indicating the completion of issuance after the end of issuance. As described later, a record whose issuance flag is not "Num=0" is unissued during issuance. In the case where there is an IC card to be reissued, the issuance flag is rewritten to "Num=0" indicating that no issuance occurs, and reissuing is carried out.

Figure 27:
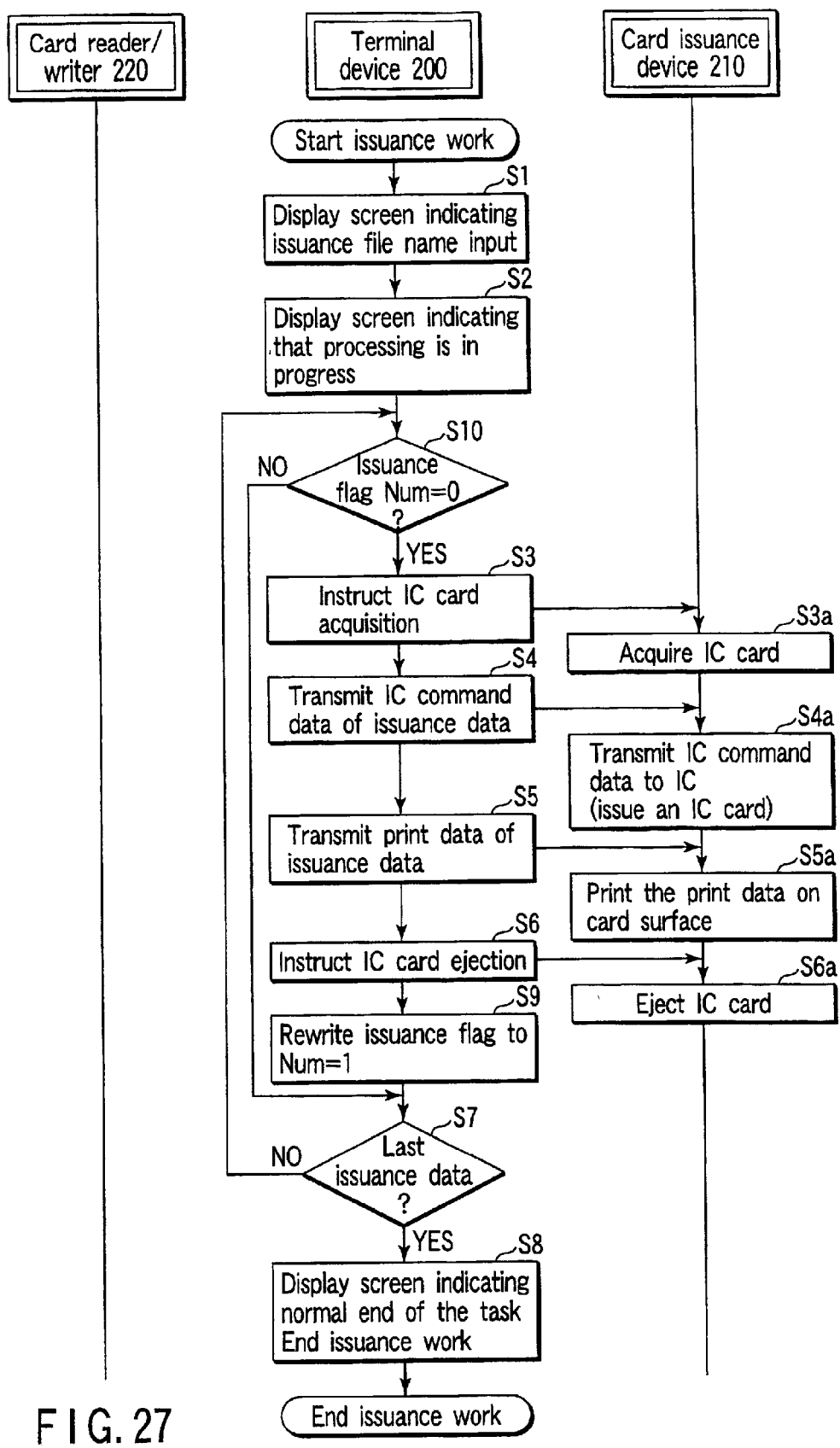
FIG. 27 is a flowchart illustrating IC card issuance processing according to a fourth embodiment of the invention.

Now, IC card issuance processing according to the fourth embodiment will be described with reference to a flowchart shown in FIG. 27. The fourth embodiment is different as compared with the third embodiment (FIG. 24) in that an issuance flag item (item 6) for a record to be issued is checked before issuance, and in that the processing at the step S9 is changed to processing for carrying out rewriting in the issuance flag item (item 6). This processing according to the fourth embodiment is processing performed at the issuer side, and is not correlated with the reissuing center.

That is, the terminal device 200 displays a screen indicating that issuance processing is in progress at the step S2, and then, checks whether or not an issuance flag item (item 6) for a record to be issued is "Num=0" (step S10). As a result of this check, in the case where the issuance flag item for a record to be issued is "Num=0", the terminal device 200 instructs the card issuing device 210 to acquire an IC card by a card reader/writer 206 (step S3). As the result of the above check, in the case where the issuance flag item for the record to be issued is not "Num=0", the terminal device 200 checks whether or not a next record is present in the issuance file (step S7).

In addition, the terminal device 200 instructs IC card ejection (step S6) after print data has been transmitted, and carries out rewriting in the issuance flag item (item 6) for the record used for issuance (step S9). In the case where a next record is present in the issuance file (step S7), processing reverts to the step S3 at which issuance processing for the next record (Record #2) is started. In the case where a plurality of IC cards are first issued in this way, all the issuance flags of the record that corresponds to the IC card are set to "1".

Figure 28:
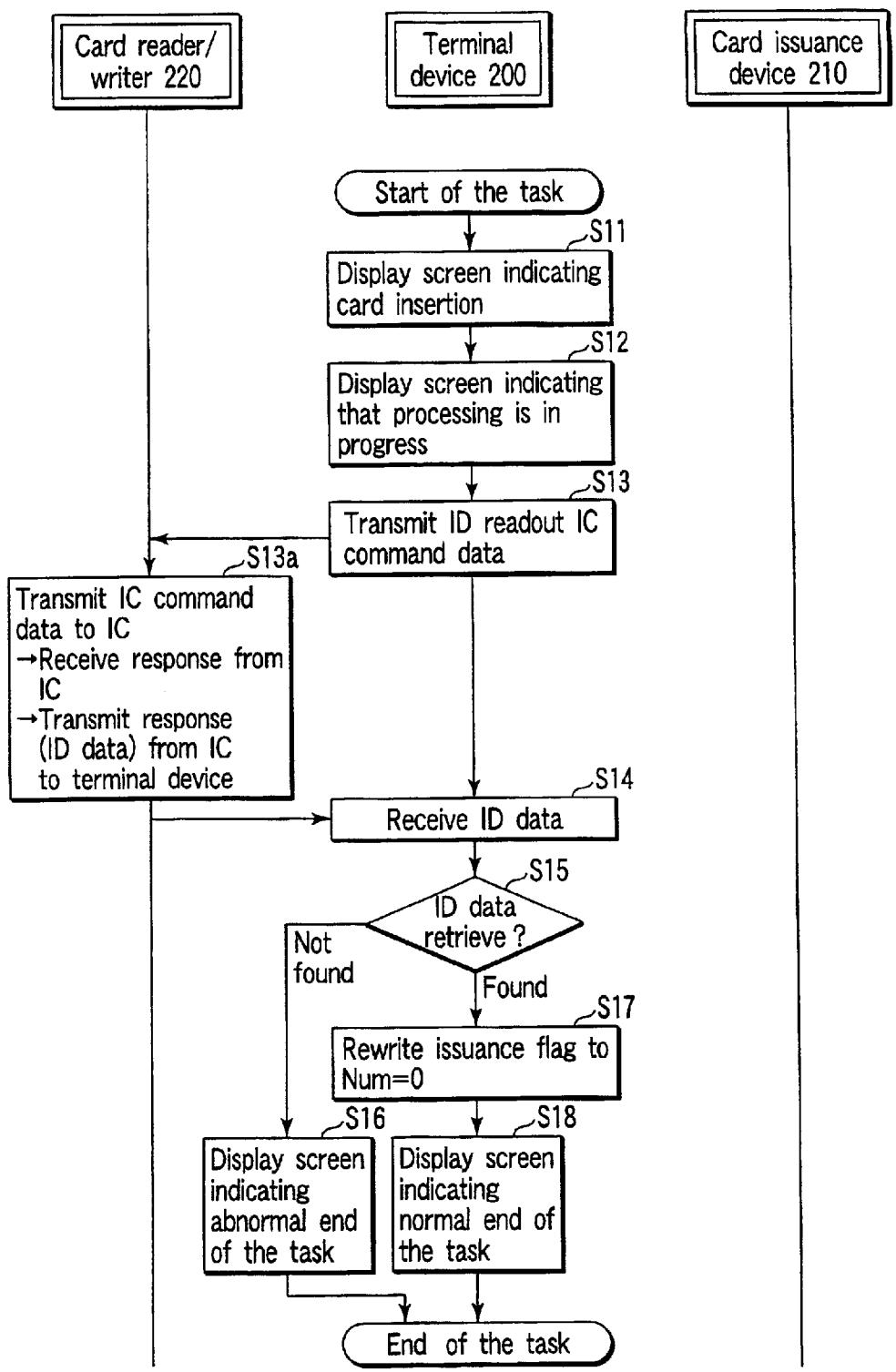
FIG. 28 is a flowchart illustrating processing for rewriting an issuance flag of issuance data on an IC card to be reissued according to the fourth embodiment.

Now, processing for rewriting an issuance flag that corresponds to an IC card to be reissued according to the fourth embodiment will be described with reference to a flowchart shown in FIG. 28. The fourth embodiment is different as compared with the first embodiment (FIG. 10) described above in that the processing at the step S17 is changed to processing for rewriting the issuance flag item of a record that corresponds to an IC card to be reissued from "Num=1" indicating the completion of issuance to "Num=0" indicating that no issuance occurs.

Figure 29:
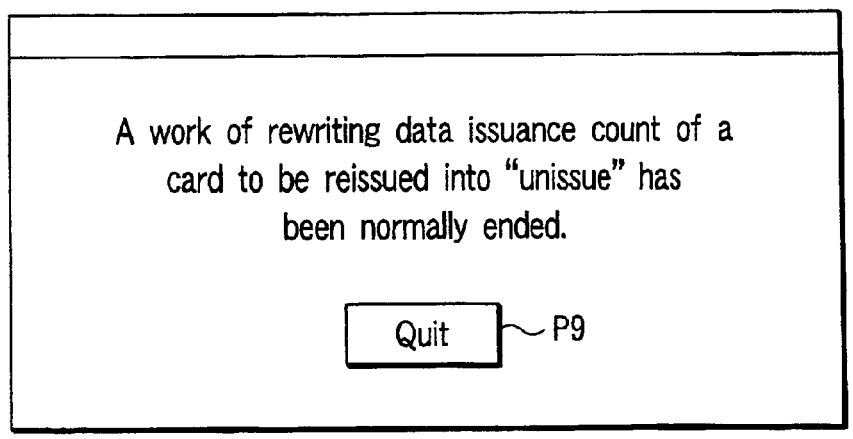
FIG. 29 is a view showing a display example of a screen indicating normal end of the task according to the fourth embodiment.

That is, at the step S15, in the case where an ID read out from an IC card to be reissued is found after retrieved from the issuance file, the terminal device 200 rewrites the issuance flag item of the record from "Num=1" to "Num=0" (step S17), and displays a screen indicating normal end of the task as shown in FIG. 29 (step S18) on the display 204. A quit button P9 is provided on this screen indicating normal end of the task, and the operator clicks this quit button P9, thereby terminating all processing.

Then, by using an issuance file in which an item for an issuance flag corresponding to an IC card to be reissued is rewritten to a non-issuance state (by inputting an issuance file name), issuance processing shown in the flowchart shown in FIG. 2 described above is carried out, whereby only an IC card to be reissued is reissued.

According to the fourth embodiment described above, an ID of an IC card to be reissued is read out from the IC card, an issuance flag of a record that corresponds to the read out ID is rewritten to "Num=0" indicating that no issuance occurs, and then, reissuing is carried out, thereby making it possible to avoid incorrect issuance.

Although the foregoing description has given a case of reading an ID that is card specific identification information and card type information from an IC card, in the case where a magnetic stripe 107 is provided on the card or in the case where a bar code is printed on the card surface, such ID and card type information may be read out from such bar code.

Although the foregoing description has given a case in which a method of reading out an ID of an IC card to be reissued is similar to that according to the first embodiment, as in the second embodiment, there may be employed a method of reading out card type information, selecting ID readout command data for each card type of the IC card to be reissued, and reading out the ID.

Now, a fifth embodiment of the invention will be described here.

FIG. 30 schematically shows an entire configuration of an IC card issuance system according to the fifth embodiment. Although reissuing is carried out by the IC card issuance device of the reissuing center E in the third embodiment described above, the fifth embodiment is different from the third embodiment in that reissuing is carried out by an automatic reissuing device G as an IC card issuing device connected to a card issuer C via a network (communication line) F.

The automatic reissuing device G is basically identical to an IC card issuance device (FIG. 23) of the reissuing center E in the third embodiment described above. This issuance device comprises: a card milling machine H as card discarding means which discards an unnecessary IC card after the end of reissuing; a stacker I for maintaining an IC card milled by thus card milling machine H; and a new card stacker J capable of maintaining raw IC cards having a plurality of designs.

Figure 31:
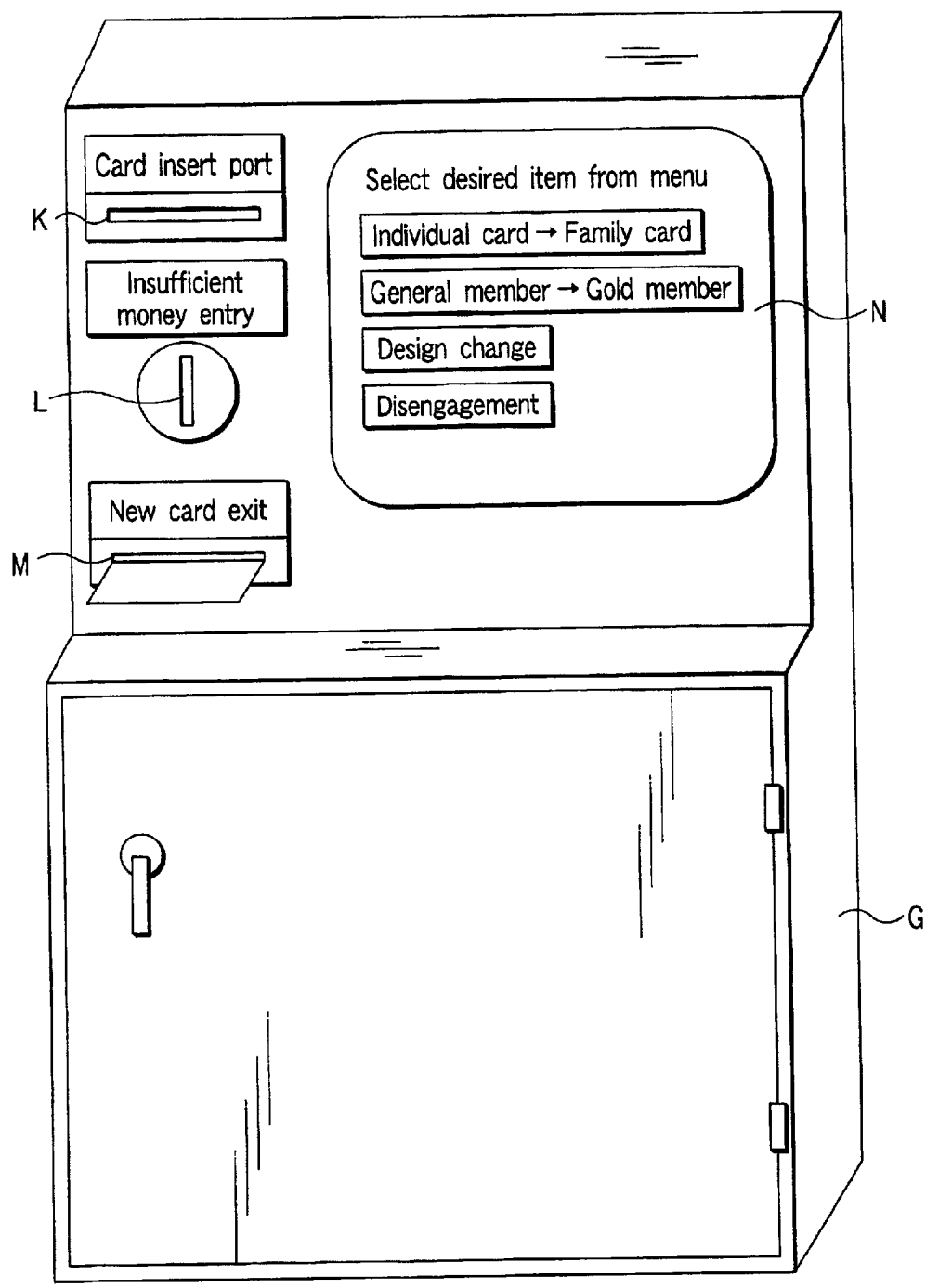
FIG. 31 is a perspective view schematically showing an external configuration of an automatic reissuing device according to the fifth embodiment.

FIG. 31 schematically shows an external configuration of the automatic reissuing device G. A card insert port K for inserting an IC card to be reissued, an insufficient money entry L for entering an insufficient amount of money, a card ejection port M from which a new IC card is ejected, a display N for displaying a variety of operational guidance and the like are provided on the contact face of the automatic reissuing device G. An IC card to be reissued, the IC card having been inserted into the card insert port K, is guided to a card reader/writer 420.

FIG. 32 shows exemplary contents of an issuance file according to the fifth embodiment. The issuance file according to the fifth embodiment is different as compared with that according to the third embodiment described above in that item 7 (card type/state item) is added.

For example, in the case where the card issuer C issues an IC card as an individual general membership card, and a user D having received such individual general membership card updates (reissues) such individual general membership card to a gold card, at the automatic issuance device G stored at a convenience store, for example, such membership card is rewritten to an individual gold card like Record #2 shown in FIG. 33 and item 7.

Figure 34:
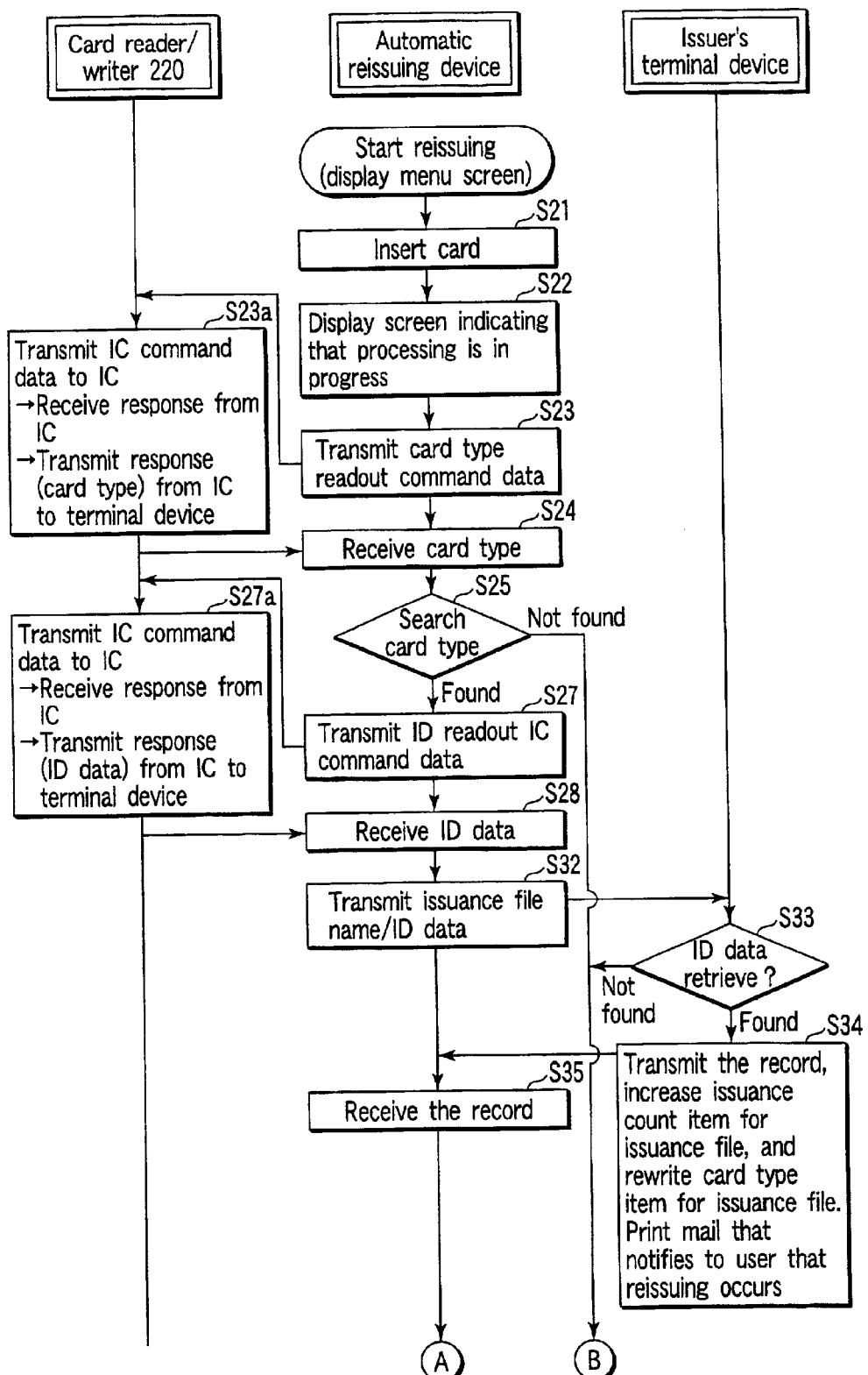
FIG. 34 is a flowchart illustrating IC card reissuing processing according to the fifth embodiment.
Figure 35:
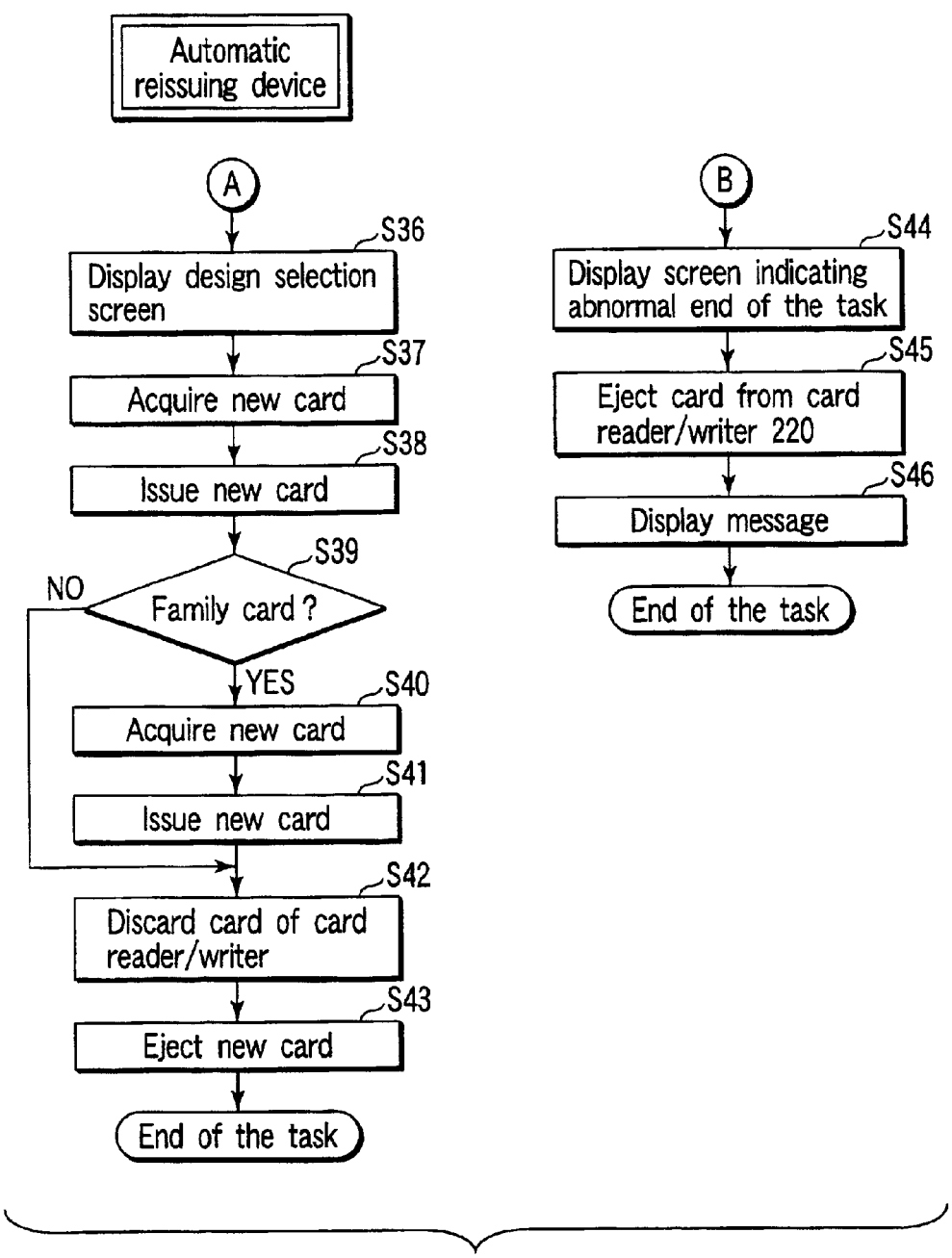
FIG. 35 is a flowchart illustrating IC card reissuing processing according to the fifth embodiment.

Now, IC card reissuing processing according to the fifth embodiment will be described with reference to a flowchart shown in FIG. 34 and FIG. 35.

First, the automatic issuing device G displays a menu screen as shown in the display N of FIG. 31. This menu screen displays, for example, an "individual card→family card" button, a "general membership→gold membership" button, a "design change" button, a "disengagement" button and the like. When any of these buttons is pressed in this state, IC card reissuing processing is started. Hereinafter, processing when the "individual card→family card" button is pressed will be described.

Processing for retrieving issuance data on an IC card to be reissued from the issuance file of the card issuer (steps S21 to S28, S32, and S33) is identical to that according to the third embodiment.

The terminal device 200 of the card issuer C retrieves a coinciding ID from the issuance file (step S33), and transmits the record to the terminal device 200 of the automatic reissuing device G (step S34). At this time, the issuance count item for the record in the issuance file is increased by 1, the card type/state item is rewritten, and further, a mail for notifying the fact that reissuing occurs to the IC card owner is printed (created) (step S34).

When a terminal device 400 of the automatic reissuing device G receives a record from the terminal device 200 of the card issuer C (step S35), the display N displays a design selection screen as shown in FIG. 36 (step S36). On this design selection screen, there are provided a plurality of card design selection buttons K of an IC card set in the new card stacker K of the automatic reissuing device G. When any of these buttons is pressed, a new IC card of the selected card design is acquired (step S37), and is issued (step S38).

Next, the terminal device 400 of the automatic reissuing device G checks whether or not a reissuing card is a family card (step S39). In the case where the checked card is a family card, a new IC card is acquired again (step S4), and is issued (step S41). The issuance of such identical card is applied to a point card, room card or the like used for shopping, as described above.

Next, when the terminal device 400 of the automatic reissuing device G checks that issuance has completed, the terminal device carries the IC card in the card reader/writer 420 to the card milling machine H, the milling machine H mills the IC card, and stacker I stores the milled card as a discarding card (step S42). Lastly, the issued new IC card is ejected to the card ejection port M (step S43), and processing is terminated.

At the step S39, in the case where the checked card is not a family card (i.e., in the case of an individual card), the terminal device 400 of the automatic reissuing device G carries the IC card in the card reader/writer 420 to the card milling machine H, the milling machine H mills the IC card, and the stacker I stores the milled card as a discarding card (step S42). Lastly, the issued new IC card is ejected to the card ejection port M (step S43), and processing is terminated.

In the case where there is no ID readout command data file name having card type information that coincides with the received card type information at the step S25 or in the case where there is no record having an ID that coincides with the received ID at the step S33, the terminal device 400 of the automatic issuance device G displays a screen indicating abnormal end of the task on the display N (step S44).

Next, the terminal device 400 of the automatic reissuing device G ejects the IC card in the card reader/writer 420 to the card insert port K (step S45), displays a message indicating abnormal end of the task on the display N (step S46), and terminates processing.

According to the fifth embodiment described above, card type information on an IC card to be reissued at a terminal device of an automatic reissuing device is read out from the IC card; an ID readout command data file is selected; an ID is read out from the IC card by using command data on the selected file; and the read out ID is transmitted to the terminal device of the card issuer. The card issuer retrieves a record having a coinciding ID from the issuance file of the terminal device, and transmits the record from the terminal device of the automatic issuing device. An IC card is reissued by the automatic reissuing device based on the transmitted record (issuance data), and incorrect issuance can be avoided. In addition, a design of an IC card to be issued can be arbitrarily selected, and thus, an IC card according to the user's preference can be issued.

Although the foregoing description has given a case of reading out an ID that is card specific identification information and card type information from an IC card, these items of information may be read out from a bar code in the case where a magnetic stripe 107 is provided on the card surface or in the case where the bar code is printed on the card surface.

In addition, although the foregoing description has given a method of selecting an ID readout command data file of an IC card to be reissued, and reading out an ID from the IC card in an automatic reissuing device, there may be employed a method of transmitting the card type information read out in the automatic reissuing device to a card issuer, selecting an ID readout command data file at the terminal device of the card issuer, transmitting command data on the selected file to the automatic reissuing device, and reading out an ID from the IC card.

Further, in the case where an issuance file is rewritten in the terminal device of the card issuer, as described above, the number of reissued IC cards or the fact that reissuing has been carried out is notified to the IC card owner by mail or the like, whereby reissuing against the card owner's intention can be detected.

As has been described above in detail, according to the present invention, for example, there can be provided an IC card issuance system capable of reliably preventing reissuing (incorrect issuance) of an IC card other than that to be reissued.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended clams and their equivalents.

What is claimed is:

1. An integrated circuit (IC) card issuance system that issues an IC card by writing issuance data containing identification information specific to the IC card into a memory of the IC card having at least the memory incorporated therein, comprising:
    an issuance file which stores each item of issuance data during issuance of each issued IC card;
    an identification information readout command storage section which stores a readout command for reading out said identification information from an issued IC card;
    an identification information readout section which reads out said identification information from an issued first IC card by using said identification information readout command storage section;
    an issuance data extracting section which extracts from said issuance file issuance data that corresponds to the identification information read out by the identification information readout section; and
    a card issuance section which issues a new second IC card identical to said issued first IC card by writing the issuance data extracted by said issuance data extracting section into a memory of an unissued IC card.

2. A system according to claim 1, further comprising a reissuing file which stores the issuance data extracted by said issuance data extracting section, said card issuance section issuing said second IC card by using the issuance data stored in said reissuing file.

3. A system according to claim 1, wherein said issuance data includes card type information indicating a type of each IC card, and said identification information readout command storage section is provided in plurality according to said card type, said system further comprising:
    a card type readout command storage section which stores a readout command for reading out said type information from an issued IC card;
    a correlation table which stores a correlation between said card type information and said identification information readout command storage sections;

a card type readout section which reads out said card type information from an issued first IC card by using said card type readout command storage section; and an identification information readout command selecting section which selects said identification information readout command storage section that corresponds to the card type information read out by the card type readout section by referring to said correlation table.

4. A system according to claim 1, wherein said issuance data includes an issuance flag indicating whether or not a corresponding IC card has been issued, said system further comprising:

a flag rewriting section which rewrites into "unissued" said issuance flag in issuance data that corresponds to the identification information read out by said identification information readout section; and an issuance instructing section which instructs issuance of the IC card to said issuance section in the case where an issuance flag of the issuance data extracted by said issuance data extracting section indicates "unissued".

5. An integrated circuit (IC) card issuance system that issues an IC card by writing issuance data containing identification information specific to the IC card into a memory of the IC card having at least the memory incorporated therein, comprising a first issuance system and a second issuance system connected to the first issuance system via a communication line, wherein said first issuance system comprises:

an issuance file which stores each item of issuance data during issuance of the each issued IC card;

an identification information readout command storage section which stores a readout command for reading out said identification information from an issued IC card;

an identification information readout section which reads out said identification information from an issued first IC card by using said identification information readout command storage section;

an issuance data extracting section which extracts from said issuance file issuance data that corresponds to the identification information read out by the identification information readout section; and a first card issuance section which issues a new second IC card identical to said issued first IC card by writing the issuance data extracted by said issuance data extracting section into a memory of an unissued IC card, and said second issuance system comprises:

a second identification information readout command storage section which stores a readout command for reading out said identification information from an issued IC card;

a second identification information readout section which reads out said identification information from an issued first IC card by using said second identification information readout command storage section;

an identification information transmission section which transmits said identification information read out by said second identification information readout section to said first issuance system via said communication line;

an issuance data receiving section which receives issuance data that corresponds to said transmitted identification information from said first issuance system; and a second card issuance section which issues a new second IC card identical to said issued first IC card by writing the issuance data received by said issuance data receiving section into a memory of an unissued IC card.

6. A system according to claim 5, wherein said issuance data includes issuance count information indicating the issuance count when the corresponding IC card has been issued, said first issuance system further comprising an issuance count update section which updates issuance count information that corresponds to said identification information transmitted from said second issuance system, and which transmits said issuance data to said second issuance system.

7. A system according to claim 5, wherein said second issuance system comprises a reissuing file which stores the issuance data received by said issuance data receiving section, said second issuance section issuing said second IC card by using the issuance data stored in said reissuing file.

8. A system according to claim 5, wherein said issuance data includes card type information indicating a type of each IC card, and said identification information readout command storage section is provided in plurality according to said card type, and said second system further comprising:

a card type readout command storage section which stores a readout command for reading out said type information from an issued IC card;

a correlation table which stores a correlation between said card type information and said identification information readout command storage sections;

a card type readout section which reads out said card type information from an issued first IC card by using said card type readout command storage section; and an identification information readout command selecting section which selects said identification information readout command storage section that corresponds to the card type information read out by the card type readout section by referring to said correlation table.

9. A system according to claim 5, further comprising a design selecting section which selects a print image design of a newly issued IC card from a plurality of print image designs different from each other, said card issuance section issuing an IC card having the print image design selected by said design selecting section.

10. A system according to claim 5, wherein said second issuance system comprises a type selecting section which selects a type of a newly issued IC card from at least two types, said card issuance section issuing an IC card of the type selected by said type selecting section.

11. A system according to claim 5, wherein said second issuance system comprises a card milling section which discards said issued first IC card when issuance of a second IC card by said second card issuance section is terminated.

12. A system according to claim 5, wherein said second issuance system comprises an issuance count notification section which notifies the IC card's user of said issuance count.

13. An integrated circuit (IC) card issuance method that issues an IC card by writing issuance data containing identification information specific to the IC card into a memory of the IC card having at least the memory incorporated therein, comprising:

reading out said identification information from an issued first IC card by using an identification information readout command data;

extracting the issuance data that corresponds to said read out identification information from an issuance file which stores each item of issuance data during issuance of each issued IC card; and issuing a new second IC card identical to said issued first IC card by writing said extracted issuance data into a memory of an unissued IC card.

14. A method according to claim 13, further comprising storing said extracted issuance data as a reissuing file, said issuing step including the step of issuing said second IC card by using the issuance data stored in said reissuing file.

15. A method according to claim 13, wherein said issuance data includes card type information indicating a type of each IC card, and said identification information readout command data is provided in plurality according to said card type, said method further comprising:

reading out said card type information from an issued first IC card; and selecting said identification information readout command data that corresponds to said read out card type information by referring to a correlation table which stores a correlation between said card type information and said plurality of identification information readout command data.

16. A method according to claim 13, wherein said issuance data includes an issuance flag indicating whether or not a corresponding IC card has been issued, said method further comprising the step of rewriting into "unissued" said issuance flag in issuance data that corresponds to said read out identification information, said issuance step including the step of issuing the IC card in the case where an issuance flag of said extracted issuance data indicates "unissued".

* * * * *